United States Patent
Meyer (12)

(10) Patent No.: US 9,188,508 B1
(45) Date of Patent: Nov. 17, 2015

(54) METHOD AND SYSTEM USING AN HVAC AIR HANDLER AND THERMOSTAT FOR BUILDING ENERGY LOSS TESTING, MONITORING AND COST CONTROL

(71) Applicant: Richard Rector Meyer, Aptos, CA (US)

(72) Inventor: Richard Rector Meyer, Aptos, CA (US)

( * ) Notice: Subject to any disclaimer, the term of this patent is extended or adjusted under 35 U.S.C. 154(b) by 0 days.

(21) Appl. No.: 14/093,494

(22) Filed: Dec. 1, 2013

(51) Int. Cl.
*G06F 19/00* (2011.01)
*G01M 99/00* (2011.01)
*F24F 11/00* (2006.01)
*G01M 3/26* (2006.01)

(52) U.S. Cl.
CPC ......... *G01M 99/005* (2013.01); *F24F 11/0009* (2013.01); *G01M 3/26* (2013.01)

(58) Field of Classification Search
USPC ............. 700/276, 277, 278; 702/50, 184, 183
See application file for complete search history.

(56) References Cited

U.S. PATENT DOCUMENTS

| | | | |
|---|---|---|---|
| 6,439,061 B1 * | 8/2002 | Nelson et al. | 73/861.65 |
| 6,749,125 B1 * | 6/2004 | Carson et al. | 236/49.3 |
| 6,994,620 B2 | 2/2006 | Mills | |
| 7,017,827 B2 * | 3/2006 | Shah et al. | 236/1 B |
| 7,848,900 B2 | 12/2010 | Steinberg et al. | |
| 7,878,009 B2 | 2/2011 | Doberstein et al. | |
| 8,131,497 B2 | 3/2012 | Steinberg et al. | |
| 8,204,628 B2 | 6/2012 | Schnell et al. | |
| 8,280,556 B2 | 10/2012 | Besore et al. | |
| 2005/0156050 A1 * | 7/2005 | Shah et al. | 236/1 B |
| 2008/0083234 A1 | 4/2008 | Krebs et al. | |
| 2011/0250833 A1 * | 10/2011 | Breed | 454/275 |

FOREIGN PATENT DOCUMENTS

WO 2013/028312 9/2013
WO PCT/US2013/028312 A1 9/2013

OTHER PUBLICATIONS

Predictive HVAC Performance Monitoring Service, brochure from EcoFactor, www.EcoFactor.com.
Nest Intelligent Thermostat, brochure from Nest Labs, https://nest.com.
California Utilities Statewide Codes and Standards Team, Residential Refrigerant Charge Testing and Related Issues, Dec. 2011, http://www.energy.ca.gov/title24/2008standards/special_-case_appliance/refrigerant/2013_CASE_R_Refrigerant_Charge_Testing_Dec_2011.pdf.
Minneapolis Blower Door, brochure from Energy Conservatory, Inc., www.EnergyConservatory.com.
DG-700 Digital Pressure and Flow Gauge, brochure from Energy Conservatory, Inc., www.EnergyConservatory.com.

(Continued)

*Primary Examiner* — Kidest Bahta
(74) *Attorney, Agent, or Firm* — Patrick Reilly

(57) ABSTRACT

An improved HVAC air handler and control system adapted for measuring and monitoring operating characteristics, the leakage of supply and return ducts to which it is connected, the infiltration leakage of the building it serves, the blockage of air return paths and the watts drawn and air flow generated by its blower. Leakages are measured by blocking outlets of all supply ducts or all return ducts, opening one side of the air handler to outdoor air, running the air handler blower, and measuring the air flow. Airflow may be measured by opening or closing orifices mounted in plenums attached to the air hander or built into the air handler cabinet, or by varying the speed of the blower motor, in connection with an integrated manometer. Thermostat firmware controls all functions.

7 Claims, 15 Drawing Sheets

(56) References Cited

OTHER PUBLICATIONS

Minneapolis Duct Blaster® Duct Airtightness Testing System, brochure from Energy Conservatory, Inc., www.EnergyConservatory.com.
DuctMask™ Temporary Register Sealing Tape, brochure from Energy Conservatory, Inc., www.EnergyConservatory.com.
TECLOG3 Feature List, brochure from Energy Conservatory, Inc., www.EnergyConservatory.com.
Model 1000 Blower Door, specifications from Retrotec, Inc., www.Retrotec.com.
Data Logger Software Operation Manual, Retrotec, Inc., www.Retrotec.com.
Model 200 DucTester, specifications from Retrotec, Inc., www.Retrotec.com.
DM—2 Mark II Digital Gauge, specifications from Retrotec, Inc., www.Retrotec.com.
Total measured duct leakage to meet Energy Star standards, procedure from Retrotec, Inc., www.Retrotec.com.
Predictive HVAC Performance Monitoring Service, brochure from EcoFactor, www.EcoFactor.com. 2013.
Nest Intelligent Thermostat, brochure from Nest Labs, https://nest.com. May 2011.
Walker, M. Sherman, M. Modera and J. Siegel, Environmental Energy Technologies Division, Energy Performance of Buildings Group, Lawrence Berkeley National Laboratory, Contract No. DE-AC03-76SF00098 "Leakage Diagnostics, Sealant Longevity, Sizing and Technology Transfer in Residential Thermal Distribution Systems," (1998), p. 43.
Sherman, M. H. And Modera, M. P., "Comparison of Measured and Predicted Infiltration Using the LBL Infiltration Model," Measured Air Leakage of Buildings, ASTM STP 904, H. R. Trechsel and P. L. Lagus, Eds., American Society for Testing and Materials, Philadelphia, 1986, pp. 325-347.
California Utilities Statewide Codes and Standards Team, Residential Refrigerant Charge Testing and Related Issues, Dec. 2011, http://www.energy.ca.gov/title24/2008standards/special_-case_appliance/ refrigerant/2013_CASE_R_Refrigerant_Charge_Testing_Dec_2011.pdf.
Minneapolis Blower Door, brochure from Energy Conservatory, Inc., www.EnergyConservatory.com, 2013.
DG-700 Digital Pressure and Flow Gauge, brochure from Energy Conservatory, Inc., www.EnergyConservatory.com, 2013.
Minneapolis Duct Blaster® Duct Airtightness Testing System, brochure from Energy Conservatory, Inc., www. EnergyConservatory.com, 2013.
DuctMask™Temporary Register Sealing Tape, brochure from Energy Conservatory, Inc., www.EnergyConservatory.com, 2013.
TECLOG3 Feature List, brochure from Energy Conservatory, Inc., www.EnergyConservatory.com, Jan. 2014.
Model 1000 Blower Door, specifications from Retrotec, Inc., www.Retrotec.com, Apr. 15, 2013.
Data Logger Software Operation Manual, Retrotec, Inc., www.Retrotec.com, Sep. 26, 2014.
Model 200 DucTester, specifications from Retrotec, Inc., www.Retrotec.com, Apr. 15, 2014.
DM-2 Mark II Digital Gauge, specifications from Retrotec, Inc., www.Retrotec.com, 2013.
Total measured duct leakage to meet Energy Star standards, procedure from Retrotec, Inc., www.Retrotec.com, Sep. 12, 2011.

* cited by examiner

METHOD AND SYSTEM USING AN HVAC AIR HANDLER AND THERMOSTAT FOR BUILDING ENERGY LOSS TESTING, MONITORING AND COST CONTROL

CROSS-REFERENCE TO RELATED APPLICATIONS

This application claims the benefit of Method and System Using an HVAC Air Handler for Building Energy Loss Testing and Monitoring, Application 61/797,428, filed Dec. 6, 2012 by the same inventor, and Method and System Using an HVAC Air Handler for Building Energy Loss Testing and Monitoring, Application 61/958,942, Filed Aug. 8, 2013 by the same inventor

FEDERALLY SPONSORED RESEARCH

None.

SEQUENCE LISTING

None.

BACKGROUND

This application relates to advanced control systems for HVAC systems that integrate testing of forced air duct leakage and building envelope infiltration, the monitoring of energy efficiency in the conditioning of buildings, the prediction of financial costs or savings from thermostat setting changes, and the monitoring of ongoing operating parameters and space conditioning costs.

Envelope infiltration and duct leakage are recognized as two of the largest wastes of energy in U.S. homes and other buildings. Infiltration in older homes is typically several times what is needed for healthy ventilation. The average California forced air duct system leaks 30%. Reducing these expensive and carbon-generating forms of leakage is universally recognized as being among the most cost effective energy retrofit measures in existing buildings and a requirement for new construction also. Testing duct leakage and infiltration against standards is becoming universal in an era of global climate change and rising energy costs, but currently require expensive equipment and a trained technician.

The 2012 versions of the International Residential Code, adopted in 49 states and the International Energy Conservation Code, adopted in 46 states, as state-wide building codes, require that both infiltration and duct leakage be measured and verified to be within strict limits, in new construction. The same standards have been widely adopted globally. Under the 2013 California Title 24 standards, duct leakage must be tested and proven less than 6% of nominal airflow and infiltration must be tested and verified to be under a limit. Other standards, such as ASHRAE Standard 152, and ASTM *Standard Test Method for Determining Air Leakage Rate by Fan Pressurization*, ASTM E 779, specify how leakage should be tested in new and existing buildings. The present system addresses the unrecognized problem of reducing the costs of this mandated testing.

Studies of duct sealing retrofits have shown reductions in heating costs of 16-18% at relatively low cost. However, programs to retrofit existing buildings have reached only a small fraction of the base of residential construction. In 2009, the US Census Bureau reported housing units totaling 130, 159,000 of which very few have been tested, much less retrofitted. The large federal weatherization assistance program (WAP), which provides energy retrofits completely free to low income homeowners, has reached only 6.4 million low-income households during the past 33 years. New approaches are needed to assure building energy efficiency in many more existing buildings The measurement of both forms of leakage currently requires test equipment costing thousands of dollars, and hours of a specially trained and certified technician, who typically makes a special visit just to conduct the tests. Most HVAC installation companies in the U.S. do not even own the necessary test equipment, and the job is left to HERS raters in new buildings and energy auditors for existing buildings. When buildings fail the tests as they often do, repeat testing is required. The most effective method of fixing leaks includes using the test equipment to continuously monitor sealing progress and to conduct "post" tests, involving hours more of skilled labor often needed at times when the test equipment and technician may not be available. Scheduling the equipment and technician can result in expensive project delays.

The unrecognized problem solved by the present system, is that the expertise to audit and improve the efficiency of houses and other small buildings needs to be simplified, made more accessible and shared more widely. Also, the system permits personnel installing HVAC to pre-test for leakages to insure that an official test by a certified person will be passed.

It has been well documented for many years that even well-designed buildings have significant inefficiencies due to lack of regular testing, maintenance and repairs. Contributing to this problem is the lack of low cost monitoring and alerting technology. Gross problems leading to poor efficiency can persist for many years undetected. The present system is a solution to this long unsolved problem by monitoring of HVAC operating parameters and overall heating and cooling efficiencies, issuing specific alerts when equipment or the building space itself needs attention.

Studies have shown that proper use of nighttime setbacks in programmable thermostats is capable of saving up to 15% of heating and cooling costs. However, many other studies that indicate the few thermostats are property programmed to achieve such savings. The present system encourages the use of setbacks by improving the user interface, predicting the financial savings that are possible for specific setbacks, using cost information derived by logging past building energy use and costs and volunteering suggestions for energy savings.

The three novel sets of features: for leakage testing, maintenance alerts, and energy cost prediction are combined into a single integrated system—a programmable thermostat with advanced energy saving features with improvements to the air handler it controls. A wide range of embodiments can implement some or all of the novel features.

PRIOR ART

The most common current method of testing ducts involves blocking all outlets and pressurizing the entire system to 25 pascals using a calibrated external forced air blower, as measured by a pressure probe inserted into an air outlet. The measured flow in CFM is then converted to a percentage of normal airflow by dividing the measured flow by estimated normal operating airflow. Operating airflow is estimated from the BTU (British Thermal Unit) output of the furnace or the tons of air conditioning using "rules of thumb."

This method is subject to significant errors:
1. Although the test uses a near-uniform pressure throughout the duct system, pressures during normal operation are far from uniform. Pressures are highest near the blower and plenums and are near zero at the outlets in the conditioned spaces. Compared with plenum leaks, leaks of identical size at the outlets have little consequence, since the pressure driving them is much less. Converting leakage measured at a near uniform pressure to a percentage of system air flow under normal non-uniform conditions necessarily involves assumptions about the locations of leaks, which may be wrong. Research sponsored by the U.S. Department of Energy found that in the worst cases, predicted leakage can be off by 300%, as described by Walker et al. The study also found actual average error rates of +−40%.

2. Variation in pressure throughout the duct system during the test provides no known good location to measure average pressure. Pressure measured varies depending on which outlet is used to sample duct pressure. A location at an outlet at the end of a leaky duct will show pressure that is significantly lower than average, for example. The magnitude of this error can only be addressed by sampling at many locations throughout the duct system, averaging the results. Even this tedious process is error prone since results will vary depending on the relative locations of large leaks and the test locations.

3. Normal airflow is commonly estimated at 400 CFM per ton of air conditioning or the furnace output in kBTU/h further divided by 21.6, whichever is larger. Measurements of actual blower flow in buildings show a wide variation around these assumed values, making the percentage calculation inaccurate.

4. The most popular conventional duct leakage test method, attaching a test fan to a return outlet, pressurizes return ducts, though they are depressurized during actual operation, merely assuming that leakage in both cases is the same. Depressurization tends to close leaks in overlapping elastic materials in the duct system.

5. The duct test fan is normally connected to the system under test using a long section of flex duct. Although the pressure drop through this flex duct varies depending on whether it is compressed or stretched, and whether it is straight or has turns, there is no compensation for this effect, introducing a further error.

Although the conventional test method has low accuracy, highly accurate and expensive test equipment is typically used, providing precision of measurement but low accuracy of the final test result. Much energy may be wasted and carbon released into the environment over the full lifetime of a building by failing to seal the ducts of a building whose actual leakage is much higher than what was reported. Unnecessary leak sealing expense is incurred as a result of a test in a building that falsely reported higher leakage than is actually present. The method of the present system reduces several of these sources of error.

There has been little prior art for monitoring building energy efficiency in residential and light commercial buildings as an indicator of the need for repairs or improvements to HVAC systems or the building envelope, with regards to residential buildings and other small buildings. Monitoring the bills from energy suppliers has little use because bills report energy use for all uses and not just space conditioning. They also respond to energy price changes, thermostat setting changes, and occupancy patterns, in addition to problems requiring maintenance or repairs. Separate energy monitors are available, but the cost of installing a sensor that detects the rate of use of natural gas, propane or heating oil is prohibitive, and such systems also cannot separate the effects of thermostat setting changes, and occupancy patterns from problems requiring maintenance or repairs. They also cannot determine if an HVAC system is operating within manufacturer's specifications or building code requirements.

PRIOR ART REFERENCES

The following is a tabulation of some prior art that presently appears relevant:

| U.S. Patents | | | |
|---|---|---|---|
| U.S. Pat. No. | Kind Code | Issue Date | Patentee |
| 7,848,900 | B2 | Dec. 7, 2010 | Steinberg et al |
| 8,131,497 | B2 | Mar. 6, 2012 | Steinberg et al |
| 8,204,628 | B2 | Jun. 19, 2012 | Schnell et al. |
| 7,878,009 | B2 | Feb. 1, 2011 | Doberstein et al. |
| 8,280,556 | B2 | Oct. 2, 2012 | Besore et al. |
| 6,994,620 | B2 | Feb. 7, 2006 | Mills |

| U.S. Patent Application Publications | | | |
|---|---|---|---|
| Publication Number | Kind Code | Pub. Date | Applicant |
| U.S. 2008/0083234 | A1 | Apr. 10, 2008 | Krebs et al. |

Nonpatent Literature Documents

Predictive HVAC Performance Monitoring Service, brochure from EcoFactor, www.EcoFactor.com.

Nest Intelligent Thermostat, brochure from Nest Labs, https://nest.com.

Walker, M. Sherman, M. Modera and J. Siegel, Environmental Energy Technologies Division, Energy Performance of Buildings Group, Lawrence Berkeley National Laboratory, Contract No. DE-AC03-76SF00098 "Leakage Diagnostics, Sealant Longevity, Sizing and Technology Transfer in Residential Thermal Distribution Systems," (1998), page 43

Sherman, M. H. and Modera, M. P., "Comparison of Measured and Predicted Infiltration Using the LBL Infiltration Model," Measured Air Leakage of Buildings, ASTM STP 904, H. R. Trechsel and P. L. Lagus, Eds., American Society for Testing and Materials, Philadelphia, 1986, pp 325-347

California Utilities Statewide Codes and Standards Team, Residential Refrigerant Charge Testing and Related Issues, December 2011, http://www.energy.ca.gov/title24/2008standards/special_-case_appliance/refrigerant/2013_CASE_R_Refrigerant_Charge_Testing_Dec__2011.pdf The system disclosed by Krebs, et al, the EcoFactor Performance Monitoring System, the Nest Intelligent Thermostat, U.S. Pat. No. 7,848,900, and U.S. Pat. No. 8,131,497 all show a thermostat that logs HVAC operations, but the data must be transferred to an external device over a communications system for analysis. By contrast, the present system performs all logging and analysis within the thermostat, requiring no external device or external communications link. This integrated approach is simpler, more reliable, and less costly. It provides immediate feedback at the time users are making thermostat programming changes, a time when they are likely to be most interested in controlling costs and maintaining efficiency. Having to retrieve analysis from a vendor or from the vendor's server lessens the usefulness of alerts and the likelihood that the building owner will see or act upon the alerts.

BUILDING AIR FLOWS AND LEAKAGE

Figure 1:
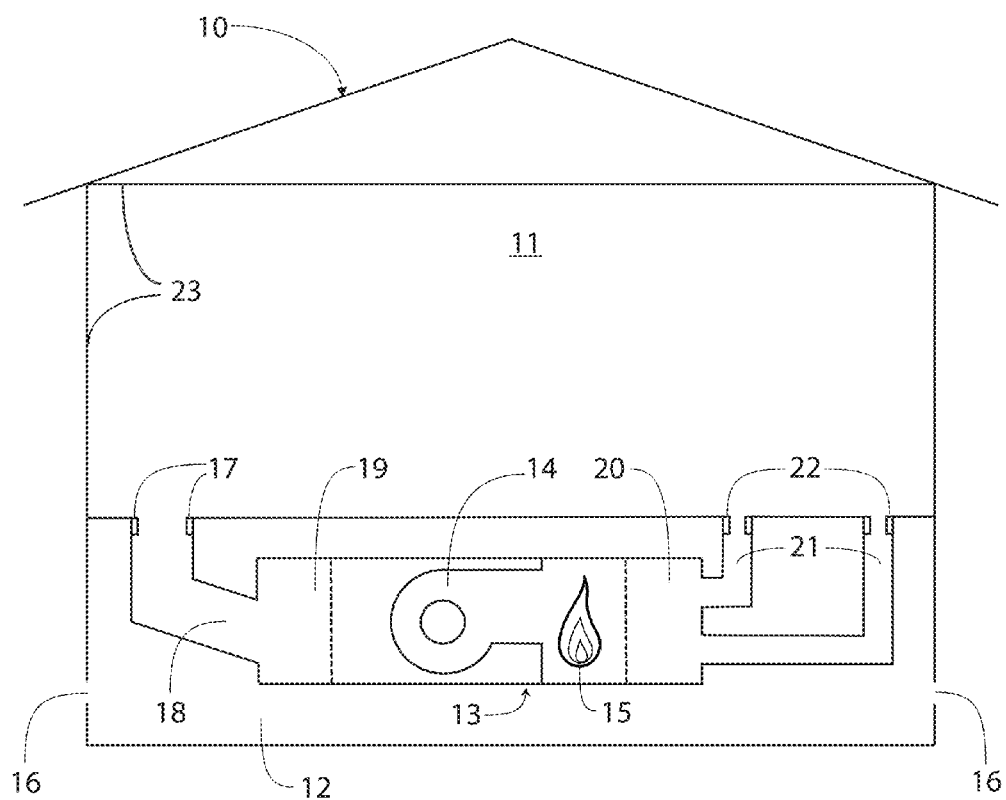
FIG. 1. Air Handler in Building Space
FIG. 2. Desired Air Flow during Air Handler Operation
FIG. 3. Duct Leakage Paths
FIG. 4. Blocked Return Paths
FIG. 5. Natural Infiltration Paths
FIG. 6. Testing Supply Duct Leakage
FIG. 7. Testing Return Duct Leakage
FIG. 8. Testing Infiltration Using Depressurization
FIG. 9. Airflow vs. Static Pressure Graph
FIG. 10. Performance Curves of Forward-Curved Centrifugal Blowers
FIG. 11A. Exploded View of Adjustable Orifice for Plenum or Air Handler Cabinet
FIG. 11b. Sectional View of Adjustable Orifice
FIG. 12. Shielded Static Pressure Probe
FIG. 13. Simple Embodiment with Inclined Tube Manometer
FIG. 14. Test Controls Integrated into a Programmable Thermostat
FIG. 15. Programmable Thermostat, front view
FIG. 16 Programmable Thermostat, side view

FIG. 1 shows the main components of a typical forced air heating, ventilating and air conditioning (HVAC) system, the prior art used in a high proportion of buildings worldwide. The purpose of the HVAC system is to provide conditioning to a conditioned space 11 within a building 10, typically consisting of one or more rooms. The building envelope 23 of the building is the external shell that confines conditioned air, including walls, ceiling, floor and openings in these surfaces, such as doors and windows. An air handler assembly 13 is located in a separate mechanical space 12, which may be a crawl space, basement, attic, garage, rooftop or dedicated mechanical room. Vents 16 provide the air handler assembly 13 with unrestricted flow of outdoor air for combustion, and to assist in the exhaust of flue gases in some systems. Vents 16, open to outdoor air, may be present in the perimeter of the crawl space, in the eaves adjoining an attic, or other location. FIG. 1 shows the equipment in a crawl space, but the principles are the same wherever it is located. By contrast, the conditioned space 11 in the building is closed off from the outside by walls, ceiling and floor with its air barrier, so that recirculated conditioned air ideally remains indoors for a long time, limited only by the need for fresh ventilation air. An air handler does not necessarily condition an entire building; often it conditions only a space within the building.

The return side of the system on the left of FIG. 1 consist of one or more return outlets 17, sometimes called registers or grilles, within the conditioned space, each connected to a return duct 18, which in turn connects to a return plenum 19, usually a large sheet metal box. The return plenum 19 attaches to the air intake orifice (opening) side of the air handler assembly 13. Air forced by blower 14 through the air handler may pass through heat and/or cool source 15. The air handler assembly 13 may be part of a furnace or heat pump, or an air conditioning, filtration, ventilation, humidification or dehumidification system, a hydronic air handler, or a system combining processes, and in this case other components may be present in the system. Similar embodiments of the novel system are applicable in each case. On the supply side of the system on the right of FIG. 1, conditioned air flows into a pressurized supply plenum 20, often another large sheet metal box that connects to one or more supply ducts 21, each with a supply outlet 22 into conditioned space 11. Often there are one or more supply outlets in each significantly sized room.

Figure 2:
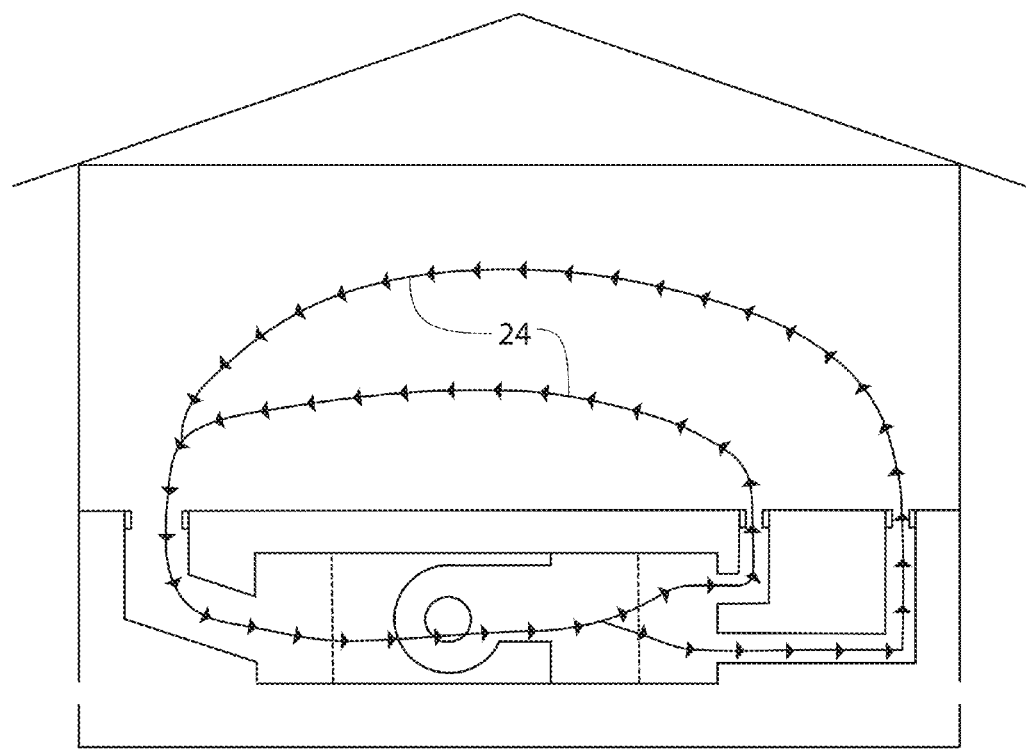

FIG. 2 shows a simplified view of the desired air flow through the system while the blower 14 is operating. Ideally, air makes a round trip, being drawn in the returns, conditioned and blown out the supply outlets, illustrated by air paths 24. The suction in the returns draws air from the building that had been supplied earlier by the supply outlets. Air supplied to different rooms makes its way back to return outlets by different return paths. Air thus makes a full circuit and the energy it contains is conserved, except for the normal energy losses through insulation, ventilation and fenestration. Mixing of air caused by turbulence from supply outlet air velocity is intended to spread the conditioned air evenly throughout the building.

Unfortunately, every element of the system has measurable air leakage, and the blower 14 drives the leakage. Duct leaks alone average 30% in existing California homes, for example, wasting 30% of heating and cooling costs.

Figure 3:
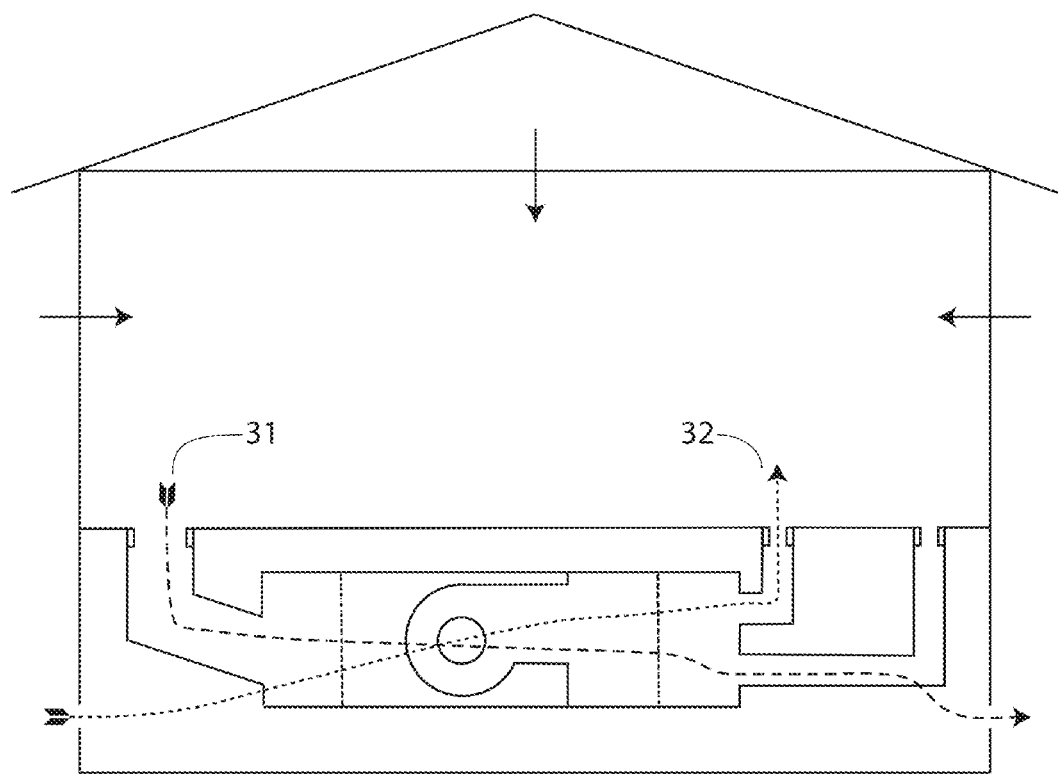

Leakage takes many forms but two common patterns of duct leaks are shown in FIG. 3. The supply ducts leak as shown with the dashed line of supply leakage path 31, and the leaked air exits the crawl space vents, rather than entering the conditioned space, thus depressurizing the conditioned space. To replace the lost air, leaks throughout the building envelope 23 leak inward. The air is drawn into the return by the air handler. Return leakage path 32 shows leakage from vents 16 into the depressurized return ducts being blown into the conditioned space. Unless return and supply duct leakages are equivalent, the imbalance, known as predominant leakage, will bring more unconditioned air into the building through one path or the other, air that requires extra heating or cooling and may also be a source of indoor air pollution.

Figure 4:
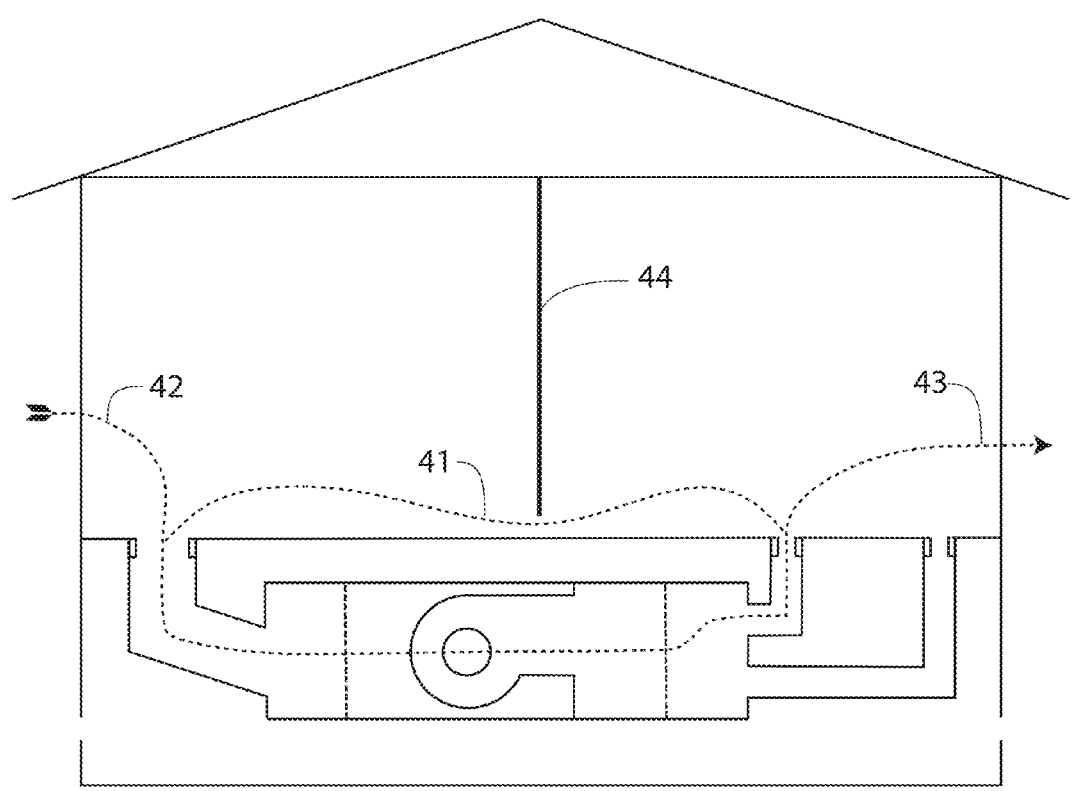

A more subtle form of leakage, shown in FIG. 4, is caused when the normal air flow path 41 of conditioned air from the supply outlets back to the return outlets is impeded by doors or other obstacles 44, or simply the length of the path. These factors tend to pressurize or depressurize areas in the conditioned space, driving envelope leakage. Infiltration path 42 occurs in depressurized areas. Exfiltration path 43 occurs in pressurized areas. Either type of leakage will cause the opposite form of leakage to occur in another area, to maintain air pressure equilibrium, so leakage occurs in either case. The air that infiltrates will need more heating or cooling than recirculated air following normal path 41 needs. The air flow through leaks from blocked return paths can be indirectly assessed by the present system by measuring total system airflow with and without interior doors open, a measurement that cannot be made by typical professional duct leakage test equipment.

Figure 5:
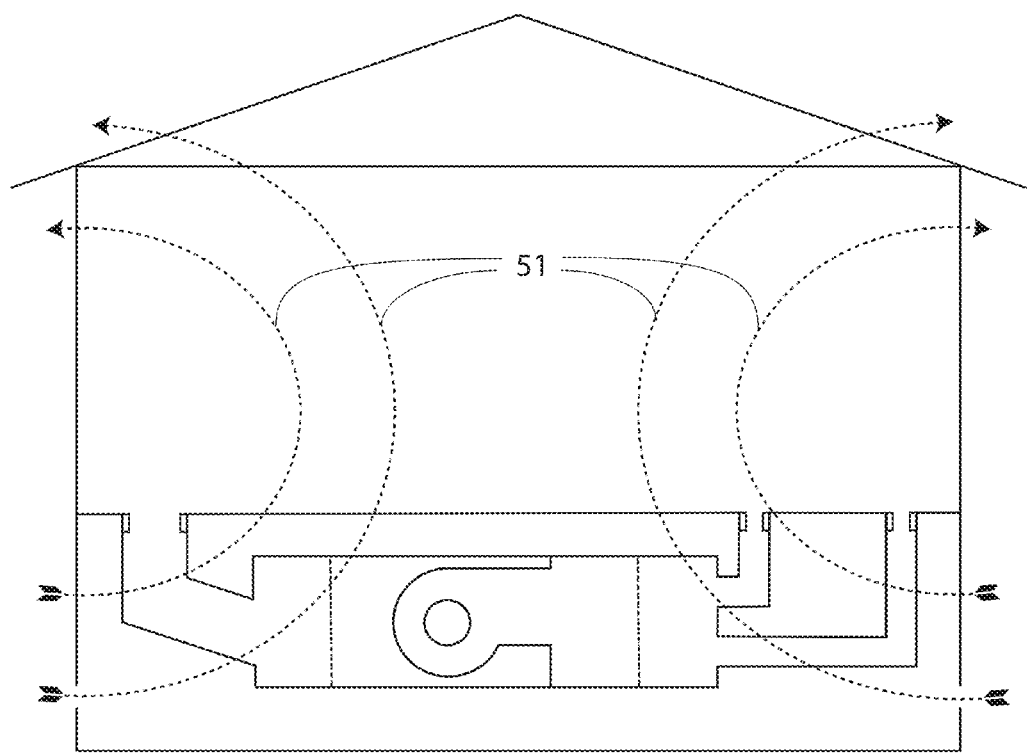

Not all leakage involves the blower and duct systems. FIG. 5, for example, shows "natural" infiltration paths 51 throughout the building, driven not by the air handler blower, but by such forces as the buoyancy of hot air, the negative buoyancy of cool air, wind forces, bath and kitchen fans, clothes dryer blowers, fireplaces, etc. Some fresh air is needed for ventilation. But in the majority of older U.S. buildings, the rate of these natural flows is significantly higher than needed for healthy ventilation, a huge loss of energy. These leaks are often in unexpected areas, but they are easy to find during a test and often inexpensive to fix. The forces that drive natural infiltration create a baseline pressure inside the building that is different than the inside, a factor that is sometimes allowed for in accurate measurement of blower-driven duct and envelope leakage.

Equations for Forced Air System Pressures

The simplified equation below incorporates the pressure gain and losses in an ideal, leak-free forced air system at equilibrium, as air is recirculated through the system in air flow paths 24 of FIG. 2:

$$P_{ah}=P_{sd}+P_{rp1}+P_{rp2}+P_{rd} \qquad \text{Eq 1}$$

Where:
- $P_{ah}$=Pressure gain across air handler assembly 13
- $P_{sd}$=Pressure loss though supply plenum 20, supply duct system 21, supply outlets 22
- $P_{rp1}$=Total return path pressure loss on pressurized side of air flow path
- $P_{rp2}$=Total return path pressure loss on depressurized side of air flow path
- $P_{rd}$=Pressure loss through return outlets 17, return duct system 18 and return plenum 19, This model separates the pressure loss of the return path into two components, one affected by building pressurization near supply outlets, and the other affected by depressurization near return outlets.

Each of the four pressure losses is associated with a separate form of leakage, which works in each case to lower the pressure drops by increasing air flow as air flows through leaks. The equation below incorporates the four various pressure losses: supply and return side leakages, infiltration and exfiltration:

$$P_{ah}=(P_{sd}-P_{sdxf})+(P_{rp1}-P_{xf})+(P_{rp2}-P_{if})+(P_{rd}-P_{rdif}) \qquad \text{Eq 2}$$

Where:
- $P_{ah}$=Pressure gain across air handler assembly 13
- $P_{sd}$=Pressure loss though supply plenum 20, supply duct system 21, and supply outlets 22
- $P_{sdxf}$=Pressure gain through supply side exfiltration
- $P_{rp1}$=Total pressure loss on pressurized side of air flow path
- $P_{xf}$=Exfiltration pressure gain in pressurized areas of building
- $P_{rp2}$=Total pressure loss on depressurized side of air flow path
- $P_{if}$=Infiltration pressure gain in depressurized areas of building
- $P_{rd}$=Pressure loss through return outlets 17, return duct system 18 and return plenum 19,
- $P_{rdif}$=Pressure gain through return side infiltration When leakages $P_{sdxf}=P_{rp}=P_{xf}=P_{if}=P_{rdif}=0$, then equation 2 reduces to equation 1. Note that in the pressurized side of the building, the pressure drop is caused by return path restriction and the exfiltration gain. On the depressurized size, there is another return path loss and an infiltration gain. Any pressure drops in intermediate zones through which infiltration or exfiltration air passes are included in $P_{xf}$ and $P_{if}$ The purpose of blocking return outlets or supply outlets, and removing covers from the plenums during test procedures described below is to eliminate terms in equation 2, so that pressure drops can be attributed to one of four components: infiltration or, exfiltration, supply duct leakage or return duct leakage.
- $P_{sdxf}$=Pressure gain through supply duct exfiltration
- $P_{xf}$=Exfiltration pressure gain in pressurized areas of building (near supplies)
- $P_{if}$=Infiltration pressure drop in depressurized areas of building (near returns)
- $P_{rdif}$=Pressure gain through return duct infiltration For example, during the supply duct test described below, the return plenum is opened to outside air, and the outlets on the supply ducts are blocked, so that $$P_{sd}=P_{rp1}=P_{xf}=P_{rp2}=P_{if}=P_{rd}=P_{rdif}=0$$

Substituting all these zeros in equation 2:

$$P_{ah}=P_{sdxf}$$

This means that the only pressure loss that balances the air handler pressure gain is due to supply duct leakage.

The resistance of the two air flow paths 24 is also of concern, since lowering their resistances lessens infiltration and exfiltration:
- $P_{rp1}$=Total pressure drop on pressurized side of path 24
- $P_{rp2}$=Total pressure drop on depressurized side of path 24

These cannot be measured directly, but their effects can be gauged indirectly. In a room with a partially blocked return path, some air returns and some leaks, but these two components cannot be separated. However, a large drop in pressure caused by removing return path blockages, indicates that blockage is significant. Such a test is best performed after infiltration leaks have been sealed.

Invention Summary

Testing with Air Handlers

The air handler assembly 13 of FIG. 1 and its control systems can be made to measure all these forms of leakage, and with further simple calculations, the resulting wasted energy and money. Four test configurations can measure supply duct leakage, return duct leakage, total duct leakage, predominant leakage, envelope infiltration and envelope exfiltration. Total duct leakage is the sum of supply and return leakage. The difference between supply and return leakage, predominant duct leakage, is a driver of overall envelope infiltration or exfiltration. Another simple test can indirectly gauge extra leakage caused by blocked return paths. Prior to conducting the tests, the normal air flow through the system in cubic feet per minute is measured, so that duct leakages can be expressed as a percentage of actual normal airflow, and not merely estimated flow.

Supply Duct Test

Figure 6:
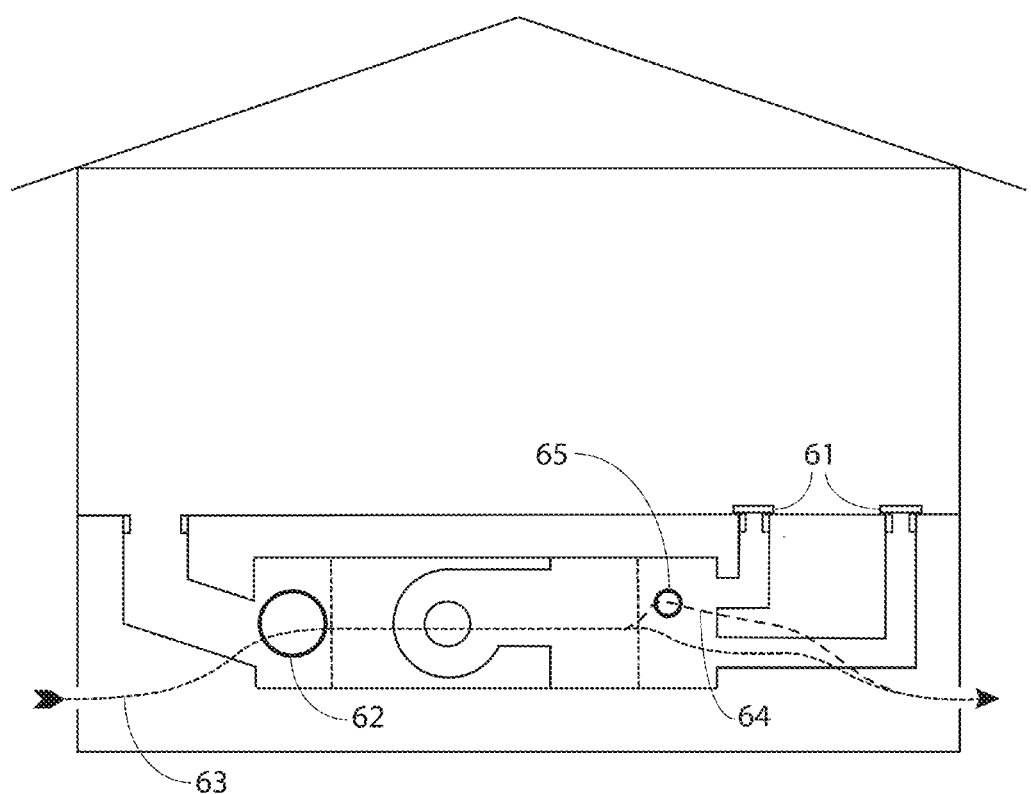

Supply ducts and return ducts are tested with similar methods. FIG. 6 shows the testing of supply ducts. All the supply outlets 22 are blocked with duct blocks 61, so that all air flow into the supply ducts must exit through their leaks. Duct blocks may consist of tape, pans, lids, or tightly sealing dampers integrated into duct outlets. The inlet side of the air handler is opened, such as by uncovering open orifice 62, or other means, for unrestricted flow. The air handler assembly 13 is run causing air to be drawn into open orifice 62, and pushed out through duct leakage flow 63, shown with a dotted line. The leakage air flow is measured using one of several means further described below. One such means is optional calibrated orifice 65, which is adjusted to maintain a standard external static pressure across the handler by allowing bypass flow 64, shown with a dashed line, as described further below. Measuring the airflow through the blower thus measures the supply duct leakage.

Supply leakage percentage is then:

$$L_{sup\%}=CFM_{test}*(P_{norm}/P_{test})^{0.65}/CFM_{norm}*100$$

Where:
- $L_{sup}\%$=supply duct leakage as a percentage of normal airflow
- $CFM_{test}$=the CFM flow rate measured during the test
- $P_{norm}$=the normal operating static pressure measured before outlets are masked
- $P_{test}$=the static pressure during the test
- $CFM_{norm}$=the normal operating airflow obtained by looking up the measured parameter in blower curve data or by means of an approximation formula The measured leakage airflow is scaled from the test pressure to the operating pressure under normal operation, and divided by normal airflow, and multiplied by 100, yielding total supply duct leakage percentage. This calculation may be performed by calculating means in the HVAC control system such as a processor in a thermostat 140 or in the air handler control logic 149, or manually by the person conducting the test using independent calculating means.

The return orifice side of the blower is given open access to outdoor air—there are many ways to do this, such as open orifice 62. When the testing capability is built into new equipment, sliding or removable covers or doors can open to provide free air flow. Other methods include temporarily removing supply ducts or the return plenum, or cutting a hole in the return plenum and covering it after the test. In new construction, this test can be conducted before return ducts are attached.

The pressurized air exits as duct leakage flow 63. Because a fixed speed blower may not be designed to handle the high static pressure caused by blocking outlets, or because accurate air flow measurement requires that pressure be maintained within a specific range, an optional calibrated bypass orifice can be used in the supply plenum or integrated into a supply duct outlet, so that the static pressure across the blower 14 is in the middle of its intended operating pressure. Alternatively, if the air handler has a variable speed blower, the blower speed can be adjusted to maintain the desired pressure without an orifice.

The total air flow through the blower can be determined, either by measuring the external static pressure across it or by monitoring the power consumed by the blower motor, or by measuring blower motor speed, then looking up the corresponding airflow using its engineering curve data. In a blower with multiple speed selections, the setting selected must be known to use the correct curve. The flow through the calibrated orifice 65 is predicted by a well-established equation, as described further below. Leakage flow is then total flow minus the calibrated bypass flow.

The test may be left running for as long as necessary for a duct sealing technician to find and fix leaks.

Return Duct Test

Figure 7:
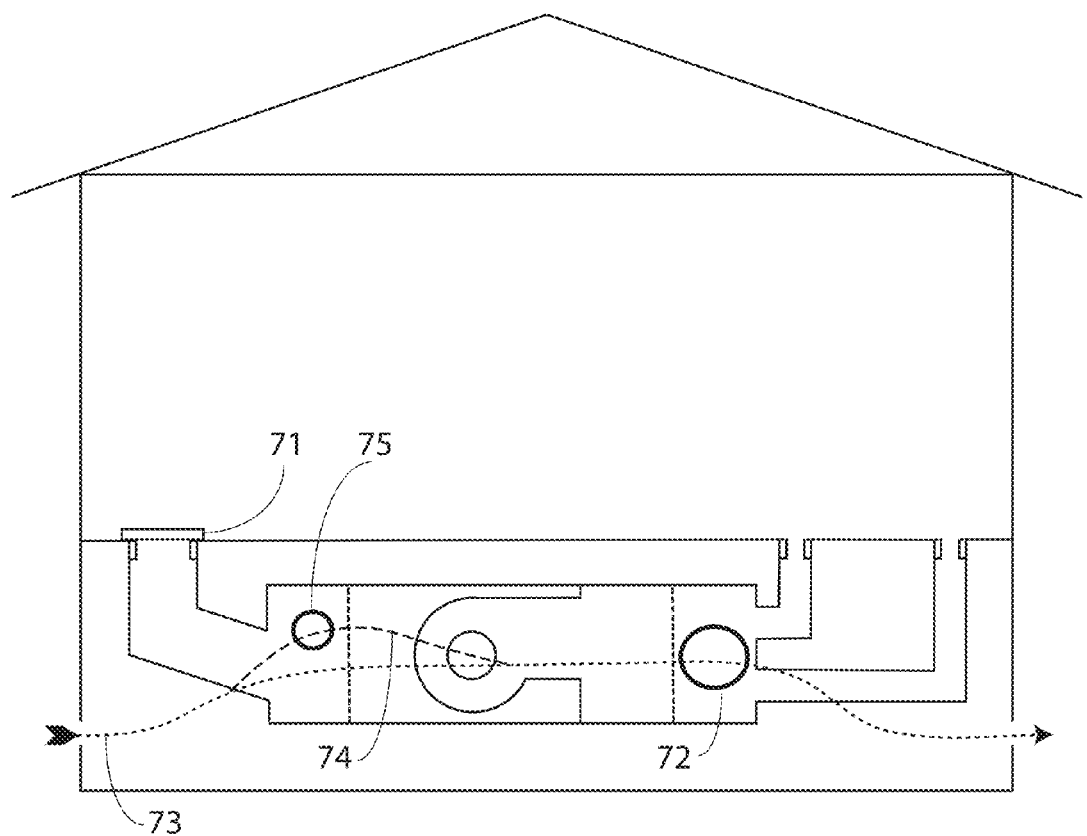

FIG. 7 shows the testing of return ducts, in a configuration very similar to the testing of supply ducts. All the return outlets are blocked with a duct block 71, so that all air flow into the return ducts must enter through their leaks. Duct blocks again may consist of tape, pans, lids, or tightly sealing dampers integrated with duct outlets. The output side of the air handler is opened, such as with open orifice 72, or other means, for unrestricted flow. The air handler assembly 13 is run causing air to be drawn as duct leakage flow 73 and pushed out through open orifice 72, shown with a dotted line. The air flow is measured using one of several means further described below. One such means is optional calibrated opening 75, which is adjusted to maintain a standard external static pressure across the handler by allowing bypass flow 74, shown with a dashed line. Measuring the airflow through the blower 14 thus measures the return duct leakage.

Return duct leakage is then:

$$L_{ret\%} = CFM_{test} * (P_{norm}/P_{test})^{0.65} / CFM_{norm} * 100$$

Where:
$L_{ret\%}$=supply duct leakage as a percentage of normal airflow
$CFM_{test}$=the CFM flow rate measured during the test adjusted
$P_{norm}$=the normal operating static pressure measured before outlets are masked
$P_{dtest}$=the static pressure during the test
$CFM_{norm}$=the normal operating airflow obtained by looking up the measured parameter in blower curve data or by means of an approximation formula Once supply and return duct leakage are measured, their sum gives total duct leakage and their difference give predominant leakage, which drives extra envelope infiltration or exfiltration. The sum may be calculated by a user or by processing means in a thermostat or air handler control system. Normal flow may be taken from the air handler specifications, but it is more accurate when measured with the same means used to measure leakage flows, as further described below. The financial cost of such leakage may be calculated by multiplying the percentage of duct leakage by the space conditioning costs, as input by the user or from logging the energy inputs to the HVAC system as further described below.

Infiltration Test

Figure 8:
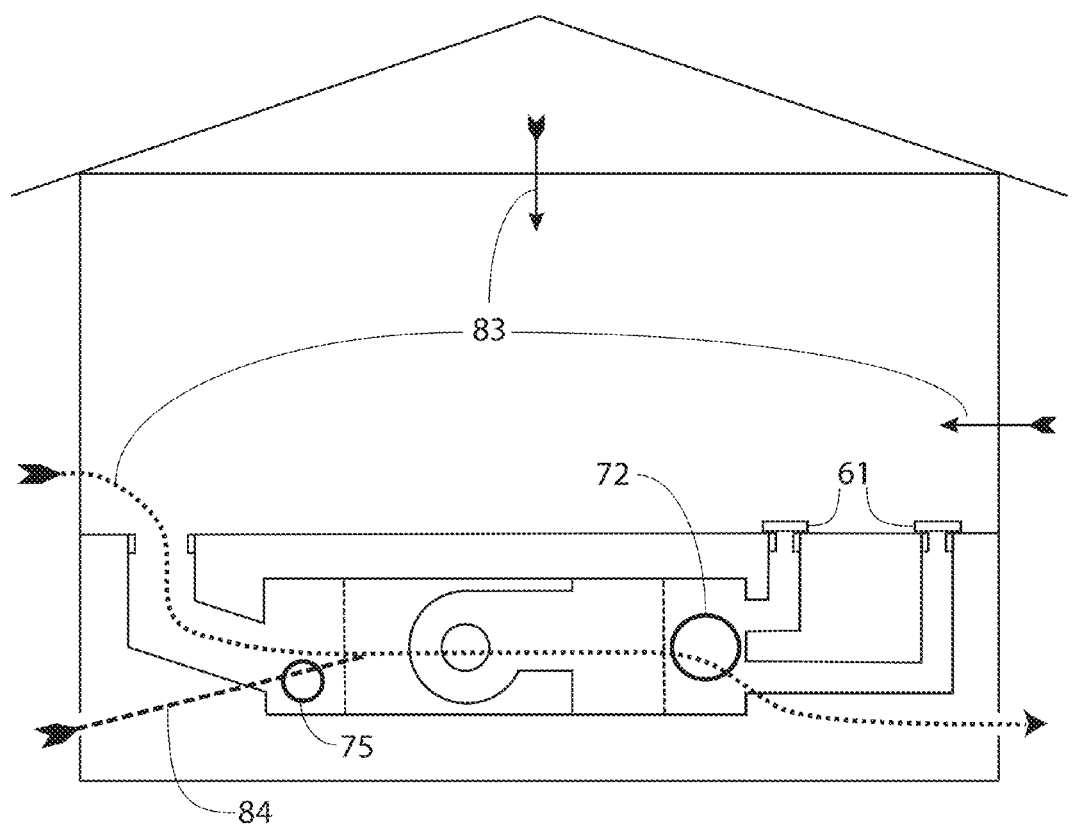

To test the entire building envelope 23 infiltration using depressurization, the test configuration of FIG. 8 is used. First, all doors windows, dampers and other openings in the building envelope are closed manually. Interior doors are opened. The supply outlets 22 are blocked by duct blocks 61 and all returns outlets 17 are left open to the flow of air from inside the building. The supply side of the air handler is opened by means of open orifice 72 to the mechanical space 12 which is in turn open to outdoor air, as previously described, for the unrestricted flow of air. Optionally, the calibrated opening 75 in the return plenum 19 is used to regulate pressure and measure flow. The air handler assembly 13 is run; the suction of the returns draws infiltration flow 83 in through all the leaks in the building envelope, but also through any return duct leaks, and the air is exhausted through the vents 16 in the mechanical space 12. Again, the size of the calibrated opening 75 needed to maintain standard static pressure is one way to measure total leakage flow. Alternatively, the calibrated opening 75 is not needed and the air flow is measured with other means, described below. In cases of high infiltration, precautions may have to be taken to prevent blower motor overload by temporarily restricting flow through the return outlet. As infiltration is reduced by sealing, the operating point of the blower may fall into its safe range and the temporary restriction may be removed.

Optionally, any previously measured return duct leakage may be subtracted from the infiltration flow measurement to arrive at a more accurate result. Optionally, the results of the test may be either read from a scale on the calibrated opening 75, or reported to a user. Optionally, the results may be converted to an air flow that would have been present had the test been conducted at a pressure of 50 pascals, the standard pressure used in prior art testing and included in certain building codes and test procedure standards. Optionally, the results may be converted to air changes per hour if the user provides the volume of the conditioned space for comparison with ventilation standards.

Optionally, said air changes per hour may to "natural" air changes per hour, using a table derived by Lawrence Berkeley Labs:

| Lawrence Berkeley Labs n-factor, Zone 4 | | | | |
|---|---|---|---|---|
| Stories: | 1 | 1.5 | 2 | 3 |
| Well-shielded from wind | 29.4 | 26.5 | 23.5 | 20.6 |
| Normal wind | 24.5 | 22.1 | 19.6 | 17.2 |
| Exposed to wind | 22.1 | 19.8 | 17.6 | 15.4 |

In practice, a number from the table is selected based on the number of stories in the home, and the windiness of the location. The infiltration air flow rate as measured during the test method and normalized to the test pressure of 50 pascals is then divided by the selected number, resulting in an estimate of the infiltration that occurs naturally through the "stack" effect and wind forces. The sample table applies only to Berkeley Labs' climate zone 4. Similar tables are available for all zones in the U.S.

Optionally, natural air changes per hour may be converted to a financial cost, using additional data supplied by the user, including the cost of energy and the average temperatures inside and outside the conditioned space, as further described below.

Infiltration as if it were measured at 50 pascals, the code standard, is then:

$$L_{if} = CFM_{test}*(50/P_{test})^{0.65} - L_{ret}*(50/P_{dtest})^{0.65}$$

Where:
- $L_{if}$ = Infiltration CFM as if measured at 50 pascals
- $CFM_{test}$ = The CFM flow rate measured during the test
- $P_{test}$ = The static pressure during the infiltration test
- $L_{ret}$ = Return duct leakage in CFM if tested in a previous test
- $P_{dtest}$ = The static pressure during the return duct test Leakage scales with pressure approximately to the exponent 0.65, depending on types of leaks, so the measured leakage is scaled to the 50 pascal equivalent that is specified in prior art test protocol standards. If return duct leakage has previously been tested, it is scaled and subtracted from the measured leakage to arrive at envelope leakage. Since supply outlets are sealed during the test, and return leakage is subtracted, the test measures true infiltration, and not infiltration plus duct leakage, as blower door tests are commonly conducted, a source of added accuracy. The cost of natural infiltration may be obtained by multiplying the natural infiltration rate in CFM times the cost of heating each replacement CFM needed to replace the infiltrated air. Such costs may be separately calculated the same way for any form of conditioning used in the building space, as previously described.

Unlike a blower door, which is placed in a convenient exterior door, this configuration uses the returns, which are usually centrally placed to be able to draw return air from all the rooms in the building, a source of added comparative accuracy.

A similar test using pressurization rather than depressurization can be conducted in analogous fashion, using the supply ducts. Since supply ducts are distributed throughout the building they tend to distribute the test pressure even more evenly than a single test equipment fan location. In this case the return rather than the supply outlets are blocked, the open orifice 62 is in the return side of the air handler, the optional calibrated opening 65 and any associated bypass flow 84 are in the supply side of the air handler. Supply duct leakage is subtracted from the raw leakage rate, for more accuracy. Other calculations are the same.

During an infiltration test, builders can find leaks easily using any number of low cost methods, such a "smoke puffer", smoke pen, strip of tissue paper, or even a bare hand as during a conventional blower door test. Since the test facility is permanently installed, there is ample time to bring in various trades to fix leaks of various types, over a period of days or even weeks, which is not practical with prior art methods.

Return Path Blockage Test

The return path test is easily visualized on FIG. 4. The test measures the impact of restrictions of air flow caused by closed doors or other obstacles 44 between supply outlets 22 and return outlets 17. If the air resistance of the return path is significant compared with the air resistance of envelope leakage, then the cost of leakage driven by return path resistance will be significant. FIG. 4 shows air flow obstacle 44 in the path between the supply and return outlets. In zones with supply outlets, there can be a resulting pressure build up that drives air through exfiltration path 43. In zones with return outlets, there can a resulting depressurization that pulls air through infiltration path 42. Even when there is just exfiltration pressure, the imbalance will draw in more are through infiltration into the system, to achieve equilibrium. In this test, no outlets are blocked and any orifices are closed. Flow is measured with interior doors closed that may restrict the return path and any other obstacles 44 in place. This flow is compared with air flow measured with doors open and other obstacles removed. The change in airflow under these conditions is related to the increased airflow through envelope leakage caused by return path blockage. A significant change is one indicator that return resistance should be reduced.

Thus simple tests using the air handler give measures of supply duct leakage, return duct leakage, total duct leakage, predominant leakage, envelope leakage, and leakage caused by blocked return paths. The test work consists merely in masking and unmasking outlets, opening an orifice, running the blower and noting the flow rate. There is no special test equipment to assemble and connect so the tests take much less time, as further detailed below. In all tests, the air handler blower is started and stopped under software control, or using the building's thermostat, building control system, or by placing jumpers on the thermostat's blower control inputs at the air handler. Orifices are adjusted to modify and measure air flow or the blower speed is adjusted.

Air handlers are designed to move air at a certain range of total external static pressures, which is the difference in static pressure between the supply plenum and the return plenum. In some cases damage to the blower or tripping of protection devices such as high static pressure switches or motor circuit breakers may occur if static pressure is too far out of range. The novel equipment and methods and described here can assure that the blower stays within safe range, by providing a compensating bypass opening, shown at 65, 75, and 86, or restriction in air flow when necessary. The size of the opening or restriction that is necessary is used to help measure the pressures and flows taking place during the test. Minimum airflow also assures sufficient cooling to the blower motor, so that any of the tests could be run continuously for long periods, while problems are fixed by various trades.

Too low a flow in an air conditioner could cause the coil to freeze; too high a flow could cause condensed moisture to be blown off into the air stream. Too low a flow in a furnace could cause inefficient operation or overheating and heat limit switch cycling. When the air handler is used for leak testing, precautions are taken to avoid these situations. Many thermostats have a blower-only position that can be used for manual testing. When testing is under the control of firmware in the thermostat, only the fan is activated during the test.

The leakage tests depend on one of the two plenums (or ends of the air handler) be open to outside air, so that the test measures air flow only through the return or supply duct system or the return duct system plus the building infiltration. If the path from the open plenum to the outdoors were restricted, then some pressure drop would be due to restriction, and the measure airflow will be less than the true air flow. The user is advised to verify that the path is not restricted. In some cases restrictions can be eliminated by, for example, opening access panels into a crawl space from outdoors, or an attic hatch in the case of duct tests.

Measuring Blower Airflow

There are three ways to estimate the airflow through the air handler assembly 13: static pressure measurement, blower power consumption, and blower impeller or motor revolutions per minute (RPM). In any case, the measurement may be made continuously by a control system and the user alerted or the system shut down if building code or manufacturer's requirements are not met. Any method may be combined with adjustable orifices, where the orifices are adjusted to bypass enough air to achieve a known operating range.

Figure 9:
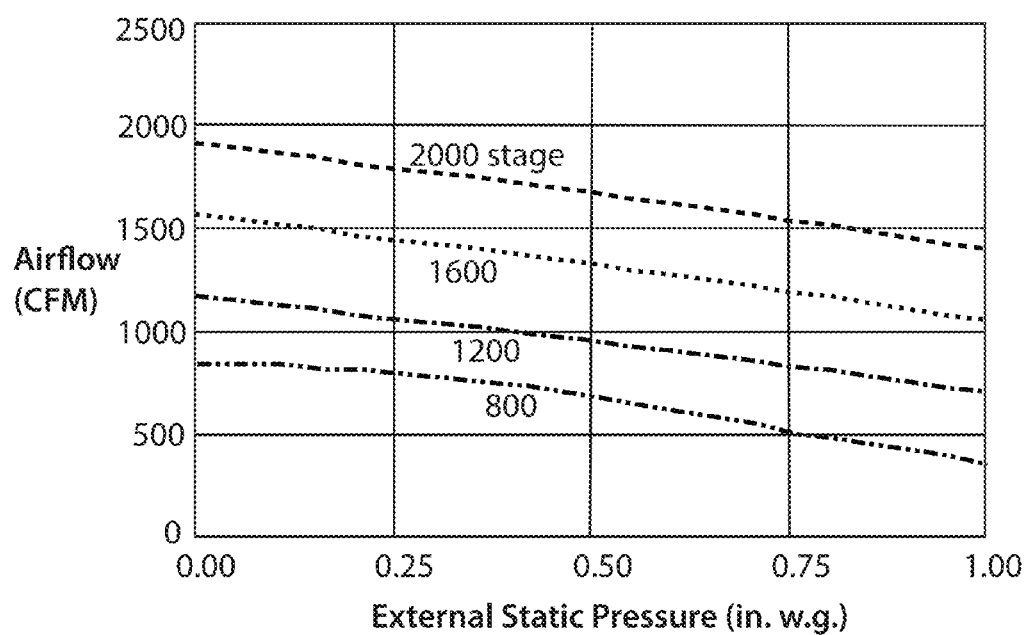

1. Static pressure across an air handler may be measured by means of an inclined manometer 139 with probes 110 inserted into the plenums or air handler cabinet as in FIG. 13, or by an electronic differential pressure sensor 145 with probes 110 as in FIG. 14. The curves in FIG. 9 were developed by the U.S. Dept. of Energy for a condensing furnace in connection with efficiency standards for furnaces. The four curves are for various motor speed settings, each designated with a different associated maximum air flow in CFM, showing static pressure versus airflow. For a given setting, if the static pressure is known, the monotonic curves have the property that there is one and only one associated air flow. Thus a polynomial formula approximating the curve or a lookup table calculated in microcontroller 141 can be used to transform pressure into air flow. For example, if an orifice in the air handler's plenum is adjusted to maintain 0.5 inches of water gauge (In. w.g. or IWC, inches of water column), the total airflow is about 700 CFM for the air handler at its 800 CFM setting or 1700 CFM at the 2000 CFM setting.

Figure 10:
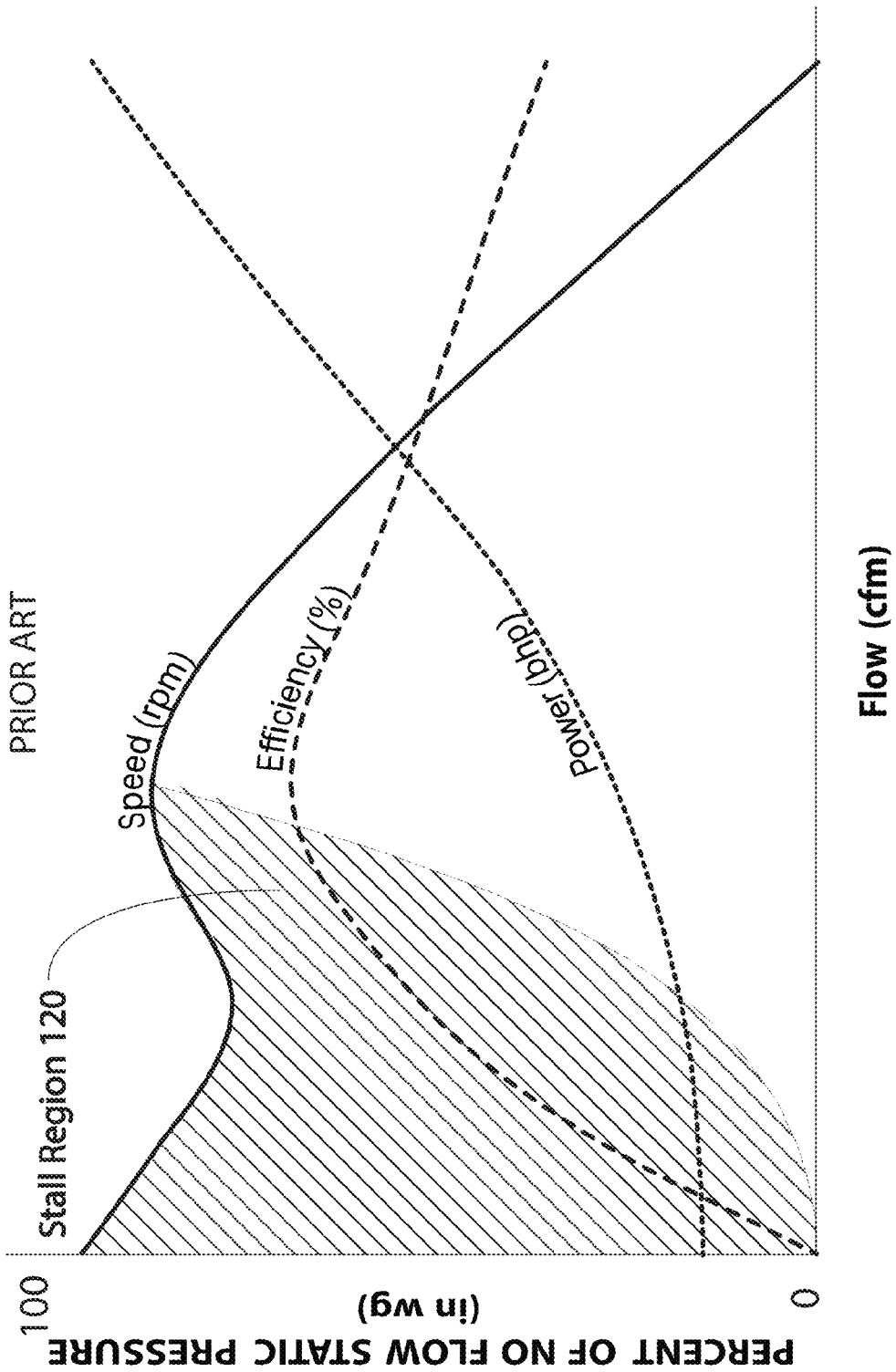

2. The power drawn by the blower motor 148 is another parameter that correlates with airflow. FIG. 10 shows the performance of a centrifugal blower 14 of the type with forward curved blades typically used in residential and light commercial air handlers. Other types of blowers have curves that can also be used with the present invention. The Y axis represents the percent of no flow static pressure that the blower is capable of when all air flow is blocked. The Efficiency curve shows that the blower's efficiency peaks at a medium flow rate. The curve marked Power shows that power used by the blower increases steadily as the airflow increases, and that for a given power there is also one and only one air flow quantity. By measuring the amperage of blower 14 using a current transformer within control logic 149, and optionally, a voltage sensor to adjust for variations in line voltage for desired accuracy, the pressure and flow can be calculated, using a polynomial formula approximation or lookup table in microcontroller 141. Power is amperage times nominal or measured blower supply voltage, times power factor. If blower power is measured and air flow calculated, then compliance with a blower watt draw per CFM efficiency standard, such as the requirement for 0.58 watts/CFM maximum in the 2013 California Energy Code, may be made, at the time of commissioning and continuously. Comparison with the point of peak efficiency may also be made concurrently.

3. The curve marked Speed in FIG. 10 shows that as additional airflow loads down the blower above a certain stall region 120 threshold, the motor speed in RPM steadily decreases. The stall region 120 can be avoided by the careful adjustment of the size of open orifice shown at 62 and 72, and the embodiment shown in FIG. 11A, or by varying blower power. By measuring the rotational velocity in RPM with a low cost tachometer 150 read by the control logic 149 and communicated to microcontroller 141 over communications link 151, the airflow can be calculated using a polynomial formula approximation or lookup table in microcontroller 141.

The curves used in all methods are unique to each air handler and are available from their manufacturers. One of the three methods of measuring airflow may be more appropriate, depending on the design of the air handler and any associated programmable thermostat or building control system, and the needed accuracy.

EMBODIMENTS

There are a wide variety of possible embodiments for the novel test methods. A simple and a sophisticated embodiment, and novel elements, are described below. The measurement methods can be integrated into air handlers and control systems used for any type of building conditioning.

Orifice Design

Figure 11A:
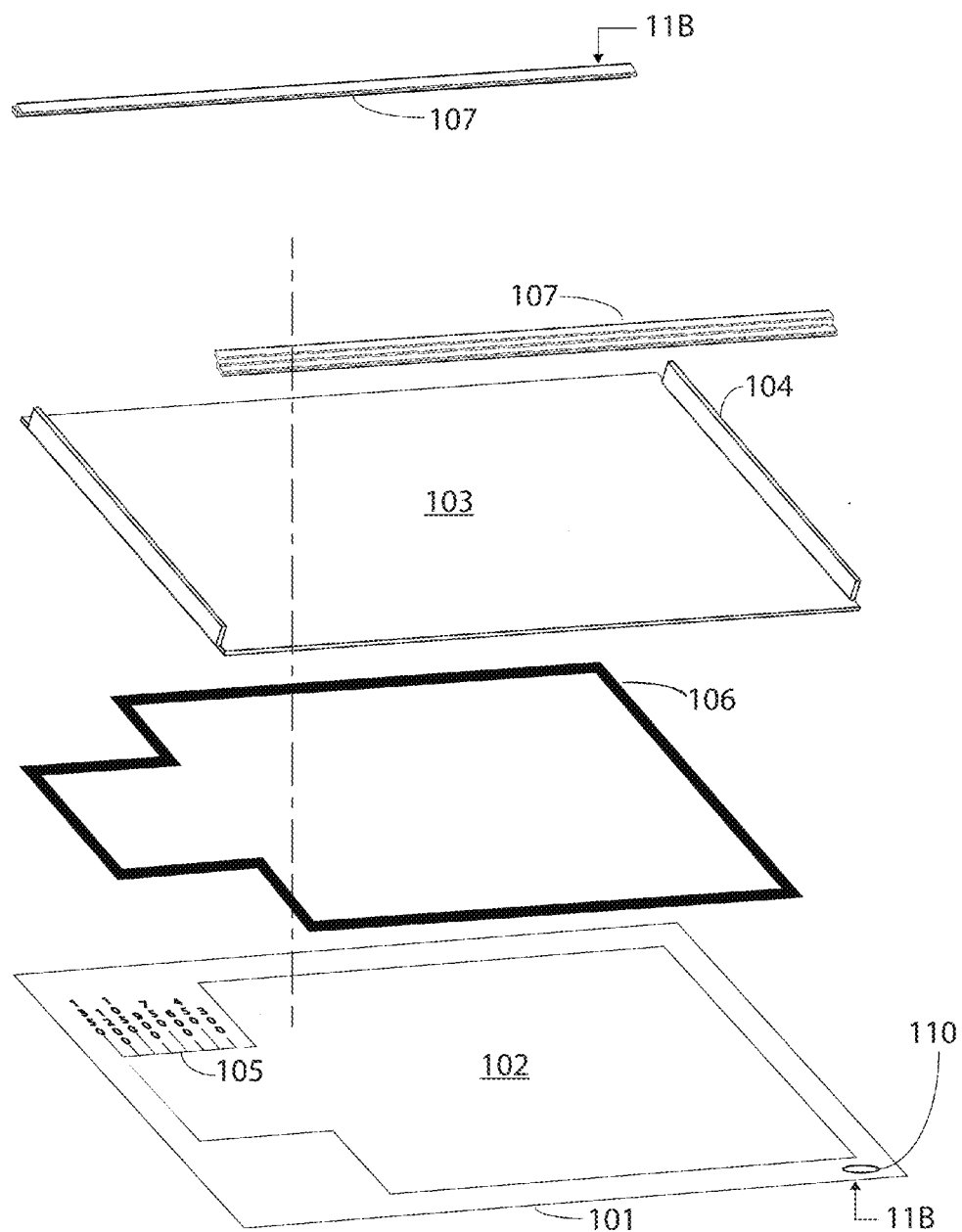
Figure 11B:
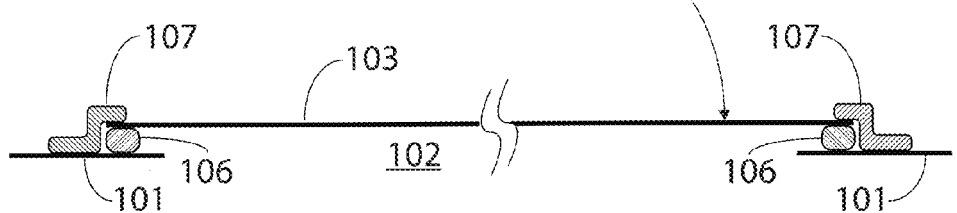

FIG. 11A depicts an exploded view of the orifice assembly used in some embodiments. The orifice assembly 100 is mounted on one of the plenum faces 101 of the plenums 19 and 20 or on the air handler cabinet 132 of FIG. 13. The calibrated orifice portion of the hole in the plenum 102 is shown on the left and a larger part of the hole on the right. A sliding cover 103, slides left and right through the metal or plastic tracks 107. Gasket 106 surrounds hole 102 on plenum face 101 for an air tight seal to cover 103. FIG. 11B shows a sectional view of the orifice assembly 100.

When the cover 103 is slid fully to the left, using its handle 104, the hole 102 is fully covered, and all airflow goes through the duct(s) 18 or 21 attached to the plenum. When cover 103 is slid or removed to expose the entire hole 102 during a test, the hole 102 permits the unrestricted flow of air. In the partially closed position, a calibration scale 105 on the face of the plenum or air handler cover aligns with the leading edge of cover 103. The scale corresponds to the airflow leakage that is forced through the ducts by virtue of the amount of closure at a standard pressure, such as 0.5 IWC.

In another easily visualized embodiment, an optional trapezoidal shape to the calibrated portion of the hole 102, with its narrow edge oriented to the left, provides for an expanded scale when low flow rates are being measured. Optional static pressure probe 110 measures the static pressure inside the plenum for differential comparison with another probe 110 in the other plenum 19 or 20. The dimensions of orifice assembly 100 and scale 105 must be matched to the characteristics of the air handler. The supply and return plenums are marked, and instructions are printed on covers 103, which are not depicted for the sake of clarity.

For new HVAC systems, plenums are manufactured with the orifice included. When it is desirable to retrofit an orifice to an existing plenum, a hole is cut in the plenum and an orifice assembly consisting of a frame with the two tracks is mounted to the plenum face with double-sided adhesive or magnets, also including gasket 106, the cover 103 and calibration scale 105.

Alternative ways to provide a large opening or orifice for unrestricted flow include means for easily removing and reattaching ducts from the plenums or plenums from the air handler. Such means may include detachable flanges to which ducts are attached. In an air handler the openings can be created by merely removing one or two panels from the front the air handler, panels that also have the purpose of permitting servicing.

Orifice Flow Calculation

The adjustable orifice assemblies 100 in the plenums or air handler cabinet that regulate and measure airflow must have a range of openings that permits airflow near the design target CFM of the air handler, typically about 400-500 CFM per ton of cooling, less for heating only, at normal operating pressure, often 0.5 IWC in external static pressure across the air handler, approximately 125 pascals. In a perfect system with no duct leakage or infiltration, all flow must go through the orifice during a duct test. The orifice will have sharp, square edges cut in sheet metal, and the flow is not "choked" by a high pressure differential, so the airflow through the orifice is predicted by this well-known "flat plate orifice" equation:

$$Q=Y*C*A*(2G*144*dP/W)E0.5$$

Where:
 Q=flow in cubic feet per second=CFM/60
 Y=compressibility factor
 C=discharge coefficient
 G=gravitational acceleration=32.2 ft/sec$^2$
 dP=pressure differential in pounds per square inch (PSI)
 W=air weight density in pounds per cubic foot
 A=area of orifice in square feet
 Solving for A, the required orifice area:

$$A=Q/(Y*C*(2*G*144*dP/W)E0.5)$$

A typical system in a small building might have 1000 CFM of airflow, which is Q of 1000/60=16.67 cubic feet per second. The compressibility factor approximates 1.0 at this relatively low operating pressure of about 1/30 of an atmosphere. The discharge coefficient for an orifice in a flat plate with square edges is 0.61. The differential pressure of 0.5 IWC equates to 0.0361/2 PSI=0.01805 PSI. The standard weight of normal dry, average sea level air is 0.0765 pounds per cubic foot at 59 degrees F. Density varies with temperature and pressure, so a correction based on the temperature in the plenums or air handler cabinet or for altitude may be made if needed for accuracy. In some embodiments, this adjustment may be made by firmware in microcontroller 141.

Substituting the preceding values in the equation:

$$A=16.67/(1*0.61*(2*32.2*144*0.01805/0.0765)E0.5$$

which equates to 0.584 square feet. An adjustable orifice of this size easily fits in one of the surfaces of typical plenums or air handler cabinets. In systems with a variable speed blower, it is possible to adjust the blower speed to provide the right airflow for the various measurements without an adjustable orifice.

Static Pressure Probe

Figure 12:
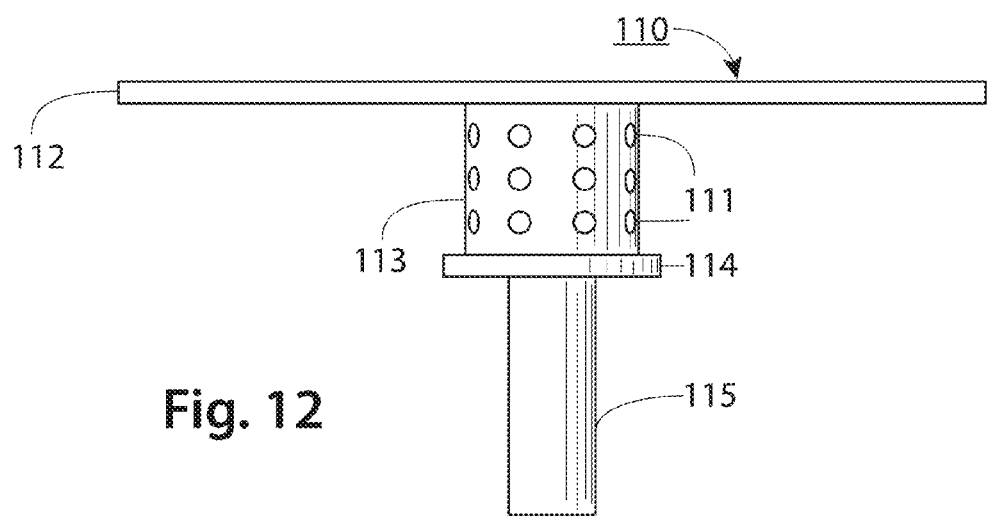

Air in plenums or air handlers is moving rapidly and is turbulent, presenting challenges in measuring static pressure. The total pressure at a given point is a sum of the velocity pressure vector from air motion, plus the scalar static pressure of stationary (static) compressed air at the same location. A simple tube with its open end perpendicular to the air stream may be adequate in some embodiments. To measure static pressure more accurately, a probe is constructed that is not sensitive to air motion, as in FIG. 12. The probe assembly 110 is constructed of metal or plastic. Pressurized air enters air inlet holes 111 into the hollow body 113 of the probe. Having holes on all sides of the body tends to cancel differences in pressure caused by air movement: pressure on one side is offset by a partial vacuum on the other side. Pressure blocking plate 112 also shields the holes 111 from much of the force of turbulent air. Plate 112 may have a triangular shape viewed from the top when probe 110 is mounted into the corner of a plenum or air handler cabinet, to fit near each of the three sheet metal surfaces meeting at the corner. Turbulence in such a corner tends to be at a minimum.

Tubing connector 115 conveys the pressurized air to an external pressure sensor, by means of plastic tubes 146, or the sensor may be mounted inside hollow body 113. The probe assembly 110 is attached to the inside of the plenum 13 or cabinet 132 with the velocity pressure blocking plate 112 parallel to the sheet metal wall or facing out from a corner and the tubing connector 115 protruding outside. A flange 114 rests against the sheet metal side of the plenum or cabinet. A plastic, rubber, or foam gasket is placed between the flange and the sheet metal and the probe assembly is secured with a push nut.

Slow moving air enters under the plate 112. The hollow body 113 smoothes pressure fluctuations over time since air moves only slowly in or out due to constriction of the air inlet holes 111 and the hollow body 113 has some volume. In embodiments that need to measure total external static pressure, probes are mounted in both the return and the supply plenums or in the air handler cabinet.

In jurisdictions or particular projects where testing is mandatory, the microcontroller in the air handler can monitor and log the pressure and/or motor power consumption to determine if mandatory test procedures have been carried out.

Simple Embodiment for Leakage Testing

Figure 13:
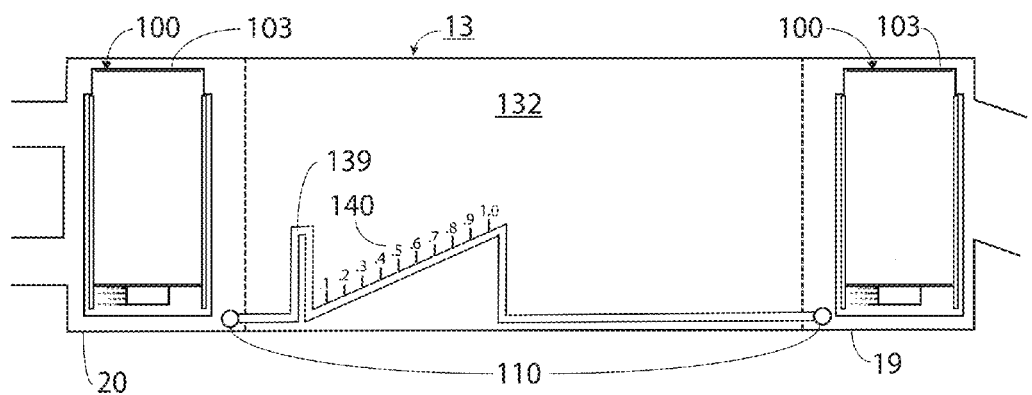

In the simplest embodiment of the system, shown in FIG. 13, adjustable orifice assemblies 100 from FIG. 11 are included in the supply plenum 20 and return plenum 19 of the air handler. A simple inclined water-filled manometer 139, with a range somewhat higher than the highest static pressure the air handler can produce, is connected to static pressure probes 110, one on each plenum, or affixed to the front of air handler assembly 13, to measure the total external static pressure across the handler. Scale 140 has graduated markings indicating static pressure. When the cover 103 is adjusted for a standard pressure reading in manometer 139, leakage air flow is read from calibration scale 105 from FIG. 11A. Simple tubes inserted into the plenums 19 and 20 may serve as static pressure probes of lower accuracy provided they are mounted at right angles to prevailing air flow, so they measure only external static pressure, and not velocity pressure.

In the prior art, portable manometers are temporarily used to make short term tests and holes are drilled in plenums for the purpose. Integrating a simple manometer into air handlers enables a wider range of tests to be conducted, and the HVAC system to be continuously monitored during normal operation and extended tests.

The simplest test, for total external static pressure, is made during normal operation, with both sliding covers 103 closed as previously described. The test determines whether the air handler is operating within manufacturer's specifications. Pressure is read directly from scale 140. Field testing of air handlers has revealed that a high proportion of air handlers are operating a higher pressures than they should due to overly restrictive ducts, blocked duct outlets, or air filters of the wrong type. Using curves from the air handler manufacturer, the air flow corresponding to a measured total external static pressure may be looked up, and compared with air flow under test conditions.

All of the five tests for supply ducts, return ducts, infiltration, exfiltration and return path blockage described above may be made with this simple embodiment. The test methods with the simple embodiment share these common steps:
 1. Return duct outlets 17 or supply duct outlets 22 are blocked
 2. One of the sliding covers 103 is fully opened or removed to provide for the free intake or exhaust of air into one side of the air handler.
 3. The air handler blower is started 4. The other sliding cover 103 is adjusted until the manometer reaches a known pressure.
5. Air flow through the duct system is read from the scale 140.

The variations in the test procedure for each test are shown in the table below:

| Test | Ducts Blocked | Orifice Opened |
|---|---|---|
| Supply duct leakage | Supply | Return |
| Return duct leakage | Return | Supply |
| Envelope Infiltration | Supply | Supply |
| Envelope exfiltration | Return | Return |

A kit to upgrade a conventional forced air system includes special plenums with the orifices or orifice assemblies to affix to the faces of existing plenums, the manometer, static pressure probes, tubing to connect the manometer to the plenums, mounting hardware, and instructions.

Sophisticated Embodiment

Figure 14:
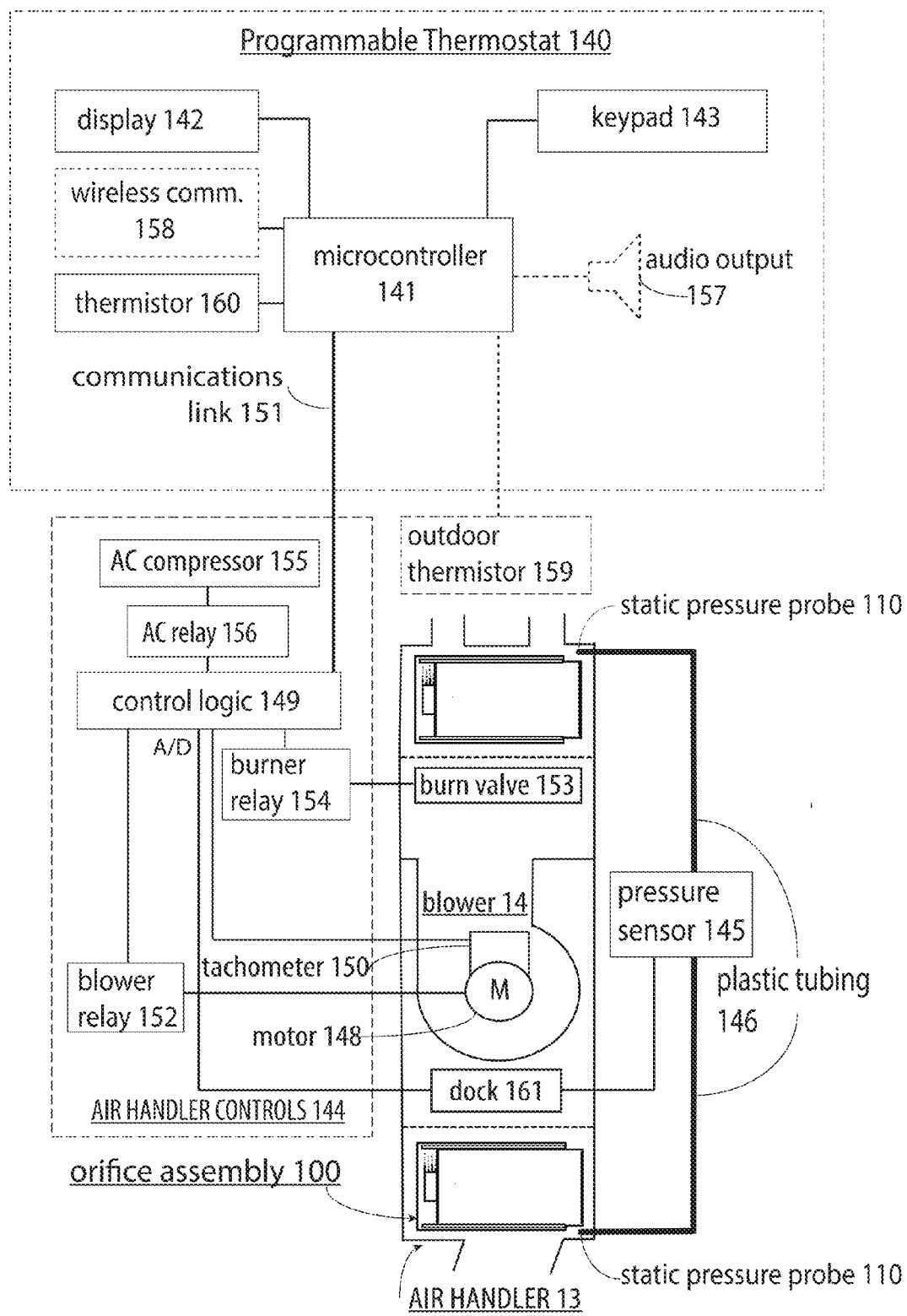

In another class of embodiments, one of which is depicted in FIG. 14, configuration, test and monitoring functions are integrated into a programmable thermostat assembly 140, using the microcontroller 141, thermistor 160, display 142 and keypad 143 in the thermostat, and the air handler control electronics 144, located inside the air handler assembly 13. The air handler assembly 13 contains blower 14 driven by motor 148, and burn valve 153. Motor 148 or control logic 149 may include a circuit breaker to prevent excessive power consumption by motor 148. In prior art thermostats that are easier to use, the functions of keypad 143 are performed by a touchscreen integrated into display 142. Recent programmable thermostats using prior art may also include wireless communications module 158 that connects the thermostat to a network. In operation according to the prior art, the thermostat 140 controls the blower relay 152, burner relay 154 and air conditioner relay 156, to activate the systems they control according to the heating and cooling schedules that have been programmed into the unit from the keypad 143 by the user, when the temperature indicated by the indoor thermistor 160 deviates from the current set points by a preset amount. The present system includes many more novel functions.

The novel additions to a typical HVAC system that the embodiment requires are:
1. orifice assemblies 100 installed in the supply plenum and the return plenum, as in the simple embodiment of FIG. 13, or other simple means for opening either end of the air hander. For example, sliding covers that can be opened, without calibration scale 105 may be used in embodiments where blower 14 is a variable speed blower, and can be adjusted to be in an acceptable operating range under varying amounts of leakage.
2. a means to measure airflow, which uses either
    a. a differential static pressure sensor 145 connected to static pressure probes 110 in both the supply and return plenums of air handler assembly 13 with plastic tubing 146. The electrical output signal of the sensor 145 is read by an analog to digital input in microcontroller 141, or
    b. the amperage drawn by motor 148 in blower 14, as measured by a current transformer included in the control logic 149 attached to the electric power supplying motor 148. Control logic 149 multiplies the amperage times the voltage supplying motor 148 and times a power factor to arrive at power consumption in watts, or
    c. the rotational velocity in revolutions per minute of the motor 148 or blower 14, as measured by tachometer 150 connected to the shaft of motor 148 or the impeller of blower 14.

Any of these methods uses blower curve data to calculate air flow given the measured parameter. Only one such method is needed, and the elements not needed may be omitted from the embodiment.
3. a serial communications link 151 between microcontroller 141 and air handler controls 144 that supplies operating power to thermostat 140 and permits the bidirectional transfer of data, including, without limitation:
    a. the mode of operation of the system, including off, heating, cooling, ventilation only, including the stage in multi-stage systems.
    b. start and stop times of the motor 148, as controlled by blower relay 152.
    c. start and stop times of the burn valve 153, as controlled by burner relay 154.
    d. optionally, start and stop times of air compressor 155, as controlled by air conditioner relay 156 if an air conditioner is part of the system. In some systems relays are replaced with solid state control elements.
    e. the measurements from one or more of: pressure sensor 145, motor power from control logic 149, or tachometer 150.
    f. optionally, the power currently being consumed by the compressor 155.
4. in microcontroller 141, additional calculating capacity, memory for firmware and the storage of logged data, and a serial communications port to connect with communications link 151.
5. an analog to digital convertor in control logic 149 for input of data from pressure sensor 145, tachometer 150 and/or current transformer and optional voltage sensor.

Optional novel elements of the system may include:
1. an audio output device 157 to sound alerts, connected to microcontroller 141, such as a loudspeaker or piezoelectric device.
2. a wireless communications capability 158 such as a Wi-Fi radio connected to microcontroller 141 for Internet or other network access, so data in the memory of microcontroller 141, configuration settings, and status information may be shared with remote systems.
3. an outdoor thermistor 159, connected to microcontroller 141. With thermistor 159 the system can record outdoor temperature over time and use the data to calculate heating degree days and cooling degree days for the building site, and monitor the temperature difference between inside and outdoors, which is used in monitoring total system efficiency. means for measuring the power consumption of the air conditioner compressor 155, such as a current transformer within control logic 149 surrounding a wire powering the compressor, may be included, to monitor the power consumption for signs of inefficient operation.

Depending on the design of the thermostat, there may be a need for additional keys on the keypad 143 such as four directional keys, not needed if display 142 has a touchscreen. Programmable thermostats are now required in new construction by the International Energy Conservation code of 2012, adopted by most states and many other jurisdictions worldwide.

Differential pressure sensor 145 measures the difference in air pressure between two probes 110 in the range of zero to one inch of water column, or whatever range of pressures can be produced by blower 14. Sensor 145 is powered by DC supplied by a power supply in control logic 149 and it outputs a variable DC voltage that is measured by an analog to digital converter in control logic 149. Suitable sensors are made by Xian Guangxing Mechano-Electronic Co. Ltd., Utmos Electronics Co. Ltd., and other manufacturers.

In embodiments including pressure sensor 145, firmware in the microcontroller 141 continuously monitors static pressure across the air handler and shuts down the blower 14 if the pressure reading indicates that the blower motor 148 is operating outside of its safe range, showing a warning in the display and sounding an optional alert if this occurs. To smooth fluctuations in pressure caused by turbulence in the plenums or wind buffeting the building, pressure reading are averaged for several seconds. This feature makes the system resistant to mistreatment by the user. An air handler assembly 13 with this feature does not need a separate high static pressure cutoff switch, as is sometime included in prior art air handlers.

Compliance with building code requirements for blower watt draw are monitored by control logic 149 and microcontroller 141, and minimum airflow per ton of air conditioning capacity is also monitored continuously. An optional audible alarm is optionally sounded if any operating parameter is outside of its acceptable range. In jurisdictions where required, the system can be disabled until the problem is fixed.

Firmware continuously logs the run times of the blower motor 148, furnace burners 153 and AC compressor 155 if present, storing data in a log file in nonvolatile memory in microcontroller 141 for the most recent 365 days, and monthly data since the system was installed.

If an outdoor thermistor 159 is connected, firmware monitors outdoor temperature, and stores hourly temperatures for most recent 365 days, and monthly data since the system was installed. In embodiments with Internet access, heating degree day data and cooling degree data for the building's location may be downloaded from a server and this data used in efficiency calculations until a full year of data has been collected by the outside thermistor 159.

If the embodiment includes monitoring and logging of power consumption of air conditioning compressor 155 by means such as a current transformer connected to AC relay 156, and the user has recorded the optimal power consumption at the time of commissioning, then the firmware in microcontroller 141 can monitor the power consumption to detect a loss of efficiency. The power consumption is recorded after verification of proper operation using procedures such as those described in the prior art reference by the California Utilities Statewide Codes and Standards Team. The monitoring process compares the current power consumption with minimum and maximum thresholds, and warns the user if a threshold is exceeded.

The total external static pressure as measured by the static pressure sensor 145 is first stored at the time indicated by the user by means of keypad 143 when the system is successfully commissioned and the pressure is deemed normal, and then continuously monitored by the firmware and compared with the initial value, and with acceptable thresholds. The trend of the pressure is also evaluated. If the pressure trend gradually increases over a period of months, exceeding a settable or preset threshold, the user is alerted to check if the furnace filter is dirty and needs cleaning or replacement. If there is sudden increase in pressure above another settable or preset threshold, the user is alerted that closing too many supply outlets too far or blocking them as with rugs or furniture leads to inefficient furnace or AC operation. If the pressure slowly decreases at a rate higher than another settable or preset threshold, then the user is alerted to have an HVAC technician check the system for leaks. If the pressure has a sudden large decrease, the user is alerted to have an HVAC technician check for disconnected ducts, boots, or an open air handler cabinet. Thresholds are set or preset high enough to prevent false positive alerts while avoiding false negatives.

The thermostat 140 firmware maintains an adjustable blower 14 lag time after burn valve 153 or AC compressor 155 turns off, so that the maximum amount of useful heat or cold is transferred to the building spaces prior to turning off the blower. The lags are adjustable because of the variable thermal mass in the system and the variable air flow that can dissipate the stored heat or cold. The lag is set during commissioning after confirmation that there is low envelope leakage driven by the blower, which could counter the savings from additional run time. The lag settings are based on measurements of delivered air temperature at the farthest outlet whose duct is likely to have the high thermal mass and/or lowest air speed, compared with ambient room temperature.

The duty cycle of energy consumption of the furnace burners is stored for the hour during which the rate was highest, together with the outside temperature (if the outside thermistor is installed) and the date and time of the data. This indicates the sizing of the furnace relative to the maximum building heating load. Ideally, the furnace is running continuously during the coldest weather.

The duty cycle of any AC compressor is also stored for the hour during which the duty cycle was highest, together with the outside temperature and the date and time of the data, an indication of the size of the AC system relative to the maximum building cooling load. Ideally, the compressor is running continuously during the hottest weather. These measurements are made only after the schedule of heating and cooling has allowed the building to recover in advance of the hour during which measurements are made. HVAC contractors and other users access this data from the logs to determine if the furnace or air conditioner is over-sized or undersized for worst case loads. The data are useful in adjusting the size of replacement equipment.

Firmware also monitors the keypad 143, or a touchscreen, for user input. If there is no input for one minute during programming of the thermostat schedule and set points, control reverts to a home screen. If there is no input for 20 minutes during a test procedure, control also reverts to running the home screen.

In embodiments with no control over blower speed and limitations on maximum or minimum operating range, so that the adjustable orifices are needed, the air handler has an optional dock 161 for the thermostat. Dock 161 is connected to control logic 149 with a communications link similar to communications link 151. Before running tests, the user has the option of moving the thermostat to the dock 161, so that the thermostat and orifices can be operated in a coordinated fashion with no need to go back and forth between the thermostat location and the air handler location during the steps in a test procedure.

Figure 15:
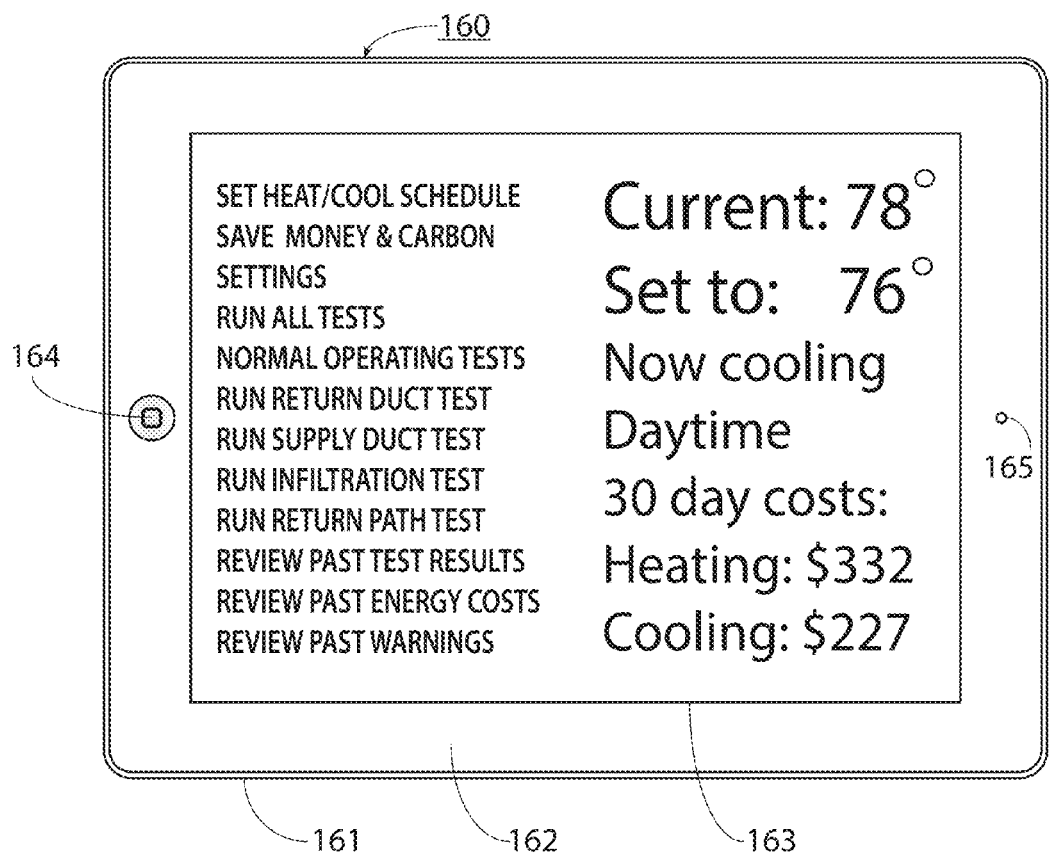

In one class of embodiments, display 142 normally display a home screen that includes a menu of functions that the thermostat 140 can perform, current temperature and set point and other information, as shown in FIG. 15. The user selects a function using keypad 143, which can also be a touchscreen 163 instead of display 142 in another embodiment.

When a test is selected by the user from the menu, firmware in the microcontroller 141 inhibits heating or cooling during tests, prompts the user through the steps of the tests, monitors the air flow during the test procedure, controls the blower motor 148, and reports and stores test results for later reference, as further detailed below. Supply and return duct leakage are measured separately. Adding the results gives total duct leakage. Subtracting the results gives predominant leakage, which affects building infiltration during blower operation, and in the case of predominant supply duct leakage, can lead to combustion safety issues. Envelope infiltration is measured with the blower depressurizing the building through the return duct(s), subtracting any previously measured return duct leakage to arrive at the infiltration in cubic feet per minute. Since return duct leakage is usually quite small relative to infiltration, its effect on accuracy is usually small.

In another class of embodiments, the thermostat 140 has a wireless interface 158 connecting with a consumer device such as a smart phone, tablet, personal computer or Internet enabled television. An "app" in the device provides a more extensive user interface and stores and displays test results. With greater screen area for more information, and a touchscreen keyboard, the interface is easier to use, and results may be shown by means of tables and graphs. Many thermostat manufacturers have added communications capability to their product lines that would permit such interface, often using Wi-Fi.

A typical sophisticated embodiment of the of the user interface implementation for an HVAC system including a single speed blower 14, a differential static pressure sensor 145 read by firmware in microcontroller 141 and a user interface with display 142 and keypad 143 is described below.

Efficiency Monitoring

Firmware in microcontroller 141 monitors the heating and cooling energy needed to achieve a given temperature difference between the indoor and outdoor temperatures, per square foot of conditioned floor area, which is a measure of the entire energy efficiency of the building and its HVAC system. The system divides efficiencies by conditioned floor area, to allow comparisons with other buildings of different sizes. Efficiency readings are averaged over a period of 30 days minimum to account for thermal mass effects and variations in building operation. An initial normal value is recorded by the user from keypad 143 at the time the HVAC system is commissioned and after significant changes, using the NORMAL OPERATING CHARACTERISTICS menu entry. If there is a significant difference in building efficiency from the normal value, the user is alerted to the decline or increase, with suggestions about how to correct certain problems.

Efficiency may be defined as BTUs per square foot of conditioned living space to achieve a given difference between indoor and outdoor temperatures. With a forced air furnace, "dynamic heating efficiency" for a period of days when only heating has been used, including n runs of furnace burners may be approximated as:

$$E_h = (\Sigma_1^n (BTUn * \Delta t_n / SQFT / \Delta T_n) + \Sigma_1^n (BTUm * \Delta t_m / SQFT / \Delta T_m))/D$$

Where:
$E_h$="dynamic heating efficiency" factor
$BTU_n$=BTU/h input to furnace burners during burner run, specific to stage
$BTU_m$=BTU/h input to blower during burner run n (converted from kW)
n=number of burner run during the measured period
m=number of blower run associated with burner run n
$\Delta t_n$=interval of burner run in hours
$\Delta u_m$=interval of blower run m associated with burner run n
SQFT=square feet of space conditioned with heating
$\Delta T_n$=average difference between mean outdoor temperature and thermostat temperature, where outdoor temperature is an optimized balance of air and radiant temperature, during period D
D=the period of time that includes n burner runs, in hours Similarly with an air conditioner or a heat pump operating in cooling mode, cooling efficiency for a period for days when only cooling has been used, including p runs of the compressor may be approximated as:

$$E_c = (\Sigma_1^p (BTUp * \Delta t_p / SQFT / \Delta T_p) + \Sigma_1^o (BTUo * \Delta t_o / SQFT / \Delta T_o))/D$$

Where:
$E_c$="dynamic cooling efficiency" factor
$BTU_p$=BTU/h input to compressor and its fan during run p (converted from kW)
$BTU_o$=BTU/h input to blower during blower run o (converted from kW)
p=number of compressor run during the measured period
o=number of compressor run associated with compressor run n
$\Delta t_p$=interval of compressor run in hours
$\Delta u_o$=interval of blower run o associated with compressor run n in hours
SQFT=square feet of space conditioned with cooling
$\Delta T_p$=average difference between mean outdoor temperature and thermostat temperature, where outdoor temperature is an optimized balance of air and radiant temperature, during period D
D=the period of time that includes n compressor runs, in hours Firmware collects the necessary data for the above calculations as follows:

| | |
|---|---|
| BTUs | BTU inputs specific to the furnace, blower and air conditioner models (converted from kW) are stored in configuration settings. |
| m, n, o, p | number of burner, compressor or blower run during the month is from run log data. If blower run time is not separately logged it can be approximated as burner or compressor run time plus a constant number of seconds, taken from equipment specifications |
| $\Delta t$ | interval of burner, compressor and blower run times in hours is from run log data |
| SQFT | square feet of space conditioned with heating, input and stored by installer in configuration settings |
| $\Delta T$ | The rate of heat loss is roughly proportional to the difference between indoor and outdoor temperatures at equilibrium as measured by thermistors 160 and 159. |

Building temperature responds to outdoor conditions in two primary ways. An outdoor air temperature different than indoor air temperature causes heat transfer by conduction through envelope surfaces, impeded by the insulation value of the envelope element. Secondly, the sun shining on envelope surfaces causes heat gain by radiation at a rate dependent on surface reflectivity and emissivity. A thermistor that is placed outdoors in a housing that can pick up some degree of solar gain, as controlled by the degree of reflectivity and emissivity of its housing, is a more accurate gauge of building gains than a simple air temperature sensor. The overall absorption is calibrated to mimic the average ratio of solar to conductive gain of typical buildings.

Dynamic efficiency will vary somewhat from its initially recorded values due to occupant behavior. Opening of doors, windows, and operating of shades and air outlets, for example, will change dynamic efficiency somewhat without being a problem. The normal operating of equipment, such as multi-stage equipment that operates at different efficiencies at different stages will also cause variation (but in this case, the firmware takes the variation into account since the firmware knows what stage is operating.) Other occupant behavior, such as leaving windows continuously open will exceed the set or preset thresholds and trigger a warning. For this reason, any notification to the user will be deferred until an averaging period of at least 30 days has completed.

Dynamic efficiencies are monitored for an initial period 30 days after commissioning, or after a calibration reset initiated by the user from keypad 143. Monthly and annual values are logged. After the initial period after calibration, dynamic efficiencies are monitored, and compared with the calibrated values. Occupant-configurable warnings may be set to be triggered to appear in display 142 or to be heard through audio output 157. The warning thresholds from the calibrated cooling and heating efficiencies have default values chosen to optimize the balance between false positives and false negatives but may be adjusted, as may the averaging period, and the type of warning given by configuration settings stored in the memory of microcontroller 141.

Static air pressure is also monitored and compared with the normal value set during commissioning or user reset.

A loss of efficiency exceeding a threshold alerts occupants that something has changed, and these deviations are converted to actionable information by simple heuristic firmware. The following heuristics are used in connection with efficiencies and other monitored parameters:

1. Over a period of 4 or more months when both heating and cooling have been required, if there is a loss of cooling but not heating efficiency, then it is more likely that the air conditioning system needs service and an alert reads "check air conditioning efficiency".
2. If there is a loss of heating efficiency but not cooling efficiency, then it is more likely that the furnace needs service and the alert reads "check furnace efficiency".
3. If both heating and cooling efficiency drop by the same amount then problems in the duct system 18 and 21, return paths 41, blower 14 or envelope 23 may be involved, or a dirty filter may need replacing, Then:
    a. If static pressure also slowly builds to a threshold value over a period of three or more months, the user is instead warned "check air filter."
    b. If pressure also slowly drops to a threshold value over a period of three or more months, the user is instead warned "check blockage or closure of duct outlets or obstruction in duct system".
4. If there are drops in both efficiencies for a few days, then recovery, it is possible that rugs or furniture temporarily blocked outlets, or that occupants are adjusting outlet dampers. No alert is given in this case because of the averaging of efficiency readings.
5. If static pressure exceeds the manufacturer's minimum, a warning is given: "Total external static pressure across air handler exceeds manufacturer's specification." Optionally, the system may shut down.
6. If the power used by the blower 14 exceed a code requirement for watts per cubic feet per minute of air flow, a warning is given, such as: "Blower power exceeds 0.53 watts/CFM". Optionally, the system may shut down.
7. If air flow is less than a code requirement for CFM/ton of air conditioning capacity, a warning is given, such as "Air flow less than 350 CFM/ton". Optionally, the system may shut down.
8. If the air conditioner compressor 155 power consumption, measured after the system has reached an equilibrium during a compressor run, is higher or lower than settable thresholds representing safe and efficient operating conditions, a warning is given, such as "Compressor power 412 watts. Normal is 480 watts. Check air conditioner, including refrigerant charge." Power varies with refrigerant charge.

Optionally the system notifies HVAC service people or utilities of any alert or warning, if communications link 151 is installed and an Internet connection is available, by emailing a test report and a year of history of warnings.

Touchscreen Thermostat

Figure 16:
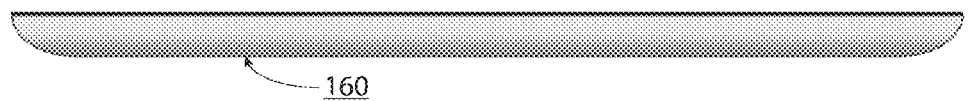

A sophisticated embodiment of thermostat 140 is illustrated in FIGS. 15 and 16. FIG. 15 shows the front view of the device, which is similar to a small tablet computer. It is housed in a plastic or metal case 161 and mounted on an interior wall in the building space, as in the prior art. A bezel 162, surrounds touchscreen 163, which occupies most of the front surface. Home button 164 is used to return to the home screen, depicted within the touchscreen area. The home screen includes a menu of functions, the current temperature, the current set point, the phase of the heating and cooling schedule, and the costs of heating and cooling during the past 30 days. Pressing the arrows to left of the current temperature will temporarily override the current set point until the next schedule change, as in the prior art. A reset button 165 reboots the device. FIG. 16 shows a top view of the thermostat 140, which is identical to the bottom view. The device has a thin profile. In use it attaches to a thin cradle mounted to the wall, as in the prior art, and is wired to communications link 151 and an optional outdoor thermistor 159.

When the thermostat is first powered on and connected to an air handler, it collects some data and prompts the person commissioning the building for other data, so the firmware has access to the following data:

ZIP code of location (needed for retrieval of heating and cooling degree data)
    altitude (needed for correction of air pressure and flow)
    square feet of conditioned occupied space
    average ceiling height in feet
    number of stories in building
    windiness of location
    marginal cost of fuel in dollars per therm
    marginal cost of electricity in dollars per kWh
    make and model of air handler assembly 13
    air flow versus static pressure curve (see FIG. 9) of air handler assembly 13 as a polynomial formula or lookup table
    blower motor 148 power in watts versus air flow curve (see FIG. 10) as a polynomial formula or lookup table
    blower motor 148 RPM versus air flow curve (see FIG. 10) as a polynomial formula or lookup table
    safe operating range and optimum operating point for the blower 14 at each stage, for static pressure, motor power and revolutions per minute, if data is available
    preset blower 14 lag after air conditioner compressor 155 run (resettable)
    preset blower 14 lag after heating run (resettable)
    furnace input in BTUs per hour at each stage
    annual fuel utilization efficiency, AFUE, of the furnace
    air conditioner 155 make and model
    tons of air conditioning capacity of air conditioner compressor 155
    SEER of air conditioner system
    air conditioner compressor 155 power consumption, in watts when operating normally the safe operating air flow maximum and minimum through the air conditioner coil 15
optimal air flow through the air conditioner coil 15
the optimal power consumption of the air conditioner compressor 155, and warning thresholds for excessive and insufficient power consumption
the kilowatt hours in blower motor 148 energy used while burning one therm of fuel, if available
the code requirement for maximum duct leakage, if any
the code requirement for minimum natural ventilation, if any, in air changes per hour
the code requirement for maximum blower power per cubic feet per minute of air flow, if any
the code requirement for minimum air flow per ton of air conditioning capacity, in cubic feet per minute, if any
the user's significance threshold in dollars, below which the system does not issue test results, alerts or warning about the costs of the various inefficiencies the system tests and monitors Menu System The menu available on the home screen reads:
SET HEAT/COOL SCHEDULE
SAVE MONEY & CARBON
SETTINGS
RUN ALL TESTS
NORMAL OPERATING TESTS
RUN RETURN DUCT TEST
RUN SUPPLY DUCT TEST
RUN INFILTRATION TEST
RUN RETURN PATH TEST
REVIEW PAST TEST RESULTS
REVIEW PAST ENERGY COSTS
REVIEW PAST WARNINGS The user makes a selection by touching a menu entry. Non-obvious choices are described below.

If the user selects SET HEAT/COOL SCHEDULE, the user can set temperatures and up to four different temperature set points for weekdays and weekends, as with prior art thermostats.

If the user selects SAVE MONEY & CARBON, the following submenu appears:
TURN DOWN THE TEMPERATURE WHEN I'M IN BED—sets nighttime schedule and temperature
TURN DOWN THE TEMPERATURE WHEN I'M AWAY—sets daytime schedule and temperature
TURN DOWN THE TEMPERATURE WHEN I'M UP—sets temperature for remaining daytime
CHECK SYSTEM EFFICIENCY—checks current operating parameters against normal
SOMETIMES I'M TOO HOT OR COLD
MAKE SUGGESTIONS SOMETIMES I'M TOO HOT OR COLD presents a submenu:
IT'S TOO COLD OR HOT WHEN I GET UP
its TOO COLD OR HOT WHEN I RETURN HOME
IT'S NEVER WARM ENOUGH OR COOL ENOUGH
TEMPERATURE IS UNCOMFORTABLE ONLY IN CERTAIN ROOMS
TEMPERATURE IS UNCOMFORTABLE ON WEEKENDS These submenu entries prompt the user through changes in schedule and set points. TEMPERATURE IS UNCOMFORTABLE ONLY IN CERTAIN ROOMS provides advice on rebalancing dampers in outlets to achieve comfort.

MAKE SUGGESTIONS looks for missing setbacks and set points that waste energy and prompts the user through specific changes to schedule and set points.

NORMAL OPERATING TESTS runs all tests that don't involve masking outlets or manipulating covers 103, and reports one or more alerts or warnings, as previously described.

If the user selects SETTINGS, the following submenu appears:
SET DATE, TIME
SET HEAT/COOL SCHEDULE
SET BUILDING LOCATION AND TYPE
SET AIR HANDLER & FURNACE CHARACTERISTICS
SET AIR CONDITIONER CHARACTERISTICS
SET FUEL AND ELECTRICITY COSTS
SET NORMAL OPERATING CHARACTERISTICS
SET WARNING THRESHOLDS
SET CODE REQUIREMENTS
OTHER SETTINGS Setting date and time are normal programmable thermostat functions from the prior art. If the user sets conditioned floor area in square feet and ceiling height in feet then the firmware calculates the conditioned volume which is used in air changes per hour calculations for comparison with code or green building standards requirements. The number of stories and windiness permit the use of Lawrence Berkeley Labs' method of estimating natural infiltration from the stack effect and winds from infiltration measured with a blower door using a pressure of 50 pascals as described by Sherman et al. in a prior art reference cited above. The cost of excessive natural infiltration can then be calculated as described below. Marginal fuel and electricity costs permits the software to calculate costs of normal heating and cooling, the cost of having inappropriate temperature set points or failing to schedule setbacks, the wasteful extra cost of having suboptimal static pressure or refrigerant charge, and the wasteful costs of envelope and duct leakage.

SET WARNING THRESHOLDS leads to a submenu:
SET THRESHOLD FOR FILTER WARNING
SET THRESHOLD FOR DUCT PRESSURE DECREASE
SET THRESHOLD FOR DUCT PRESSURE INCREASE
SET THRESHOLD FOR COOLING EFFICIENCY DECLINE
SET THRESHOLD FOR HEATING EFFICIENCY DECLINE
SET THRESHOLDS FOR COMPRESSOR POWER
SET CODE REQUIREMENTS leads to a submenu that sets numeric values:
MAXIMUM INFILTRATION RATE
MAXIMUM TOTAL DUCT LEAKAGE
MAXIMUM FAN WATT DRAW
MINIMUM AIR FLOW PER TON OF AC These variables all have default values representing the most common code requirements as of the time of manufacture.

The OTHER SETTINGS menu entry leads to a screen of miscellaneous settings, including the entry of up to three email addresses to be sent alerts and warning messages, along with the name of the recipient and a check box to enable or disable sending of messages. These addresses can be used, for example, to alert users, building operators, HVAC maintenance personnel, energy auditors and utilities.

The data for furnace and air handler assembly 13 characteristics is made available to the microcontroller 141 in one of five classes of embodiment:
 1. Data can be preprogrammed into the thermostat 140 at the time of manufacture, for sale only with the air handlers 13 for which the data corresponds.

2. Data for a variety of air handlers can be preprogrammed into the thermostat at the time of manufacture. A menu entry in the thermostat's user interface then leads to a configuration step when the model air handler is selected.
3. Data for the air handler and furnace is stored in control logic 149. When thermostat 140 is first connected to control logic 149 through communications link 151, and both are powered on, the thermostat firmware requests the air handler data from control logic 149 and control logic 149 sends it to microcontroller 141.
4. Data for the air handler is stored in a server accessible through the Internet to thermostat 140 equipped with wireless communications link 151. When thermostat 140 is first connected to the Internet, firmware requests that the user select the manufacturer of the air handler assembly 13 from a menu of manufacturers downloaded from the server and displayed in display 142. Following the selection of manufacturer the user is asked to select the model number in the same way. The server then downloads appropriate air handler data to microcontroller 141.
5. Data is entered by the installer at the time of installation. This option is shown in the example menus above.

Table 1 below shows the steps for the RUN ALL TESTS menu entry, specifying actions the firmware must take and text the user inputs from keypad 143 or touchscreen 163 or sees in the display 142. An embodiment with a fixed speed blower and an adjustable orifice assembly is assumed. The table has the same purpose as a flow chart, but integrates a more complete description of the actions at each step and is more compact. Branching is described with text. For the sake of clarity, reference numerals have been omitted. The table assumes that the blower's optimal static pressure is 0.5 IWC, by way of example only, but the actual optimal pressure associated with a particular air handler is displayed. The table assumes that a year's worth of operating data has already been collected.

TABLE 1

Steps in Running All Tests

| Step | Prompt in Display | Actions and notes |
|---|---|---|
| 1 | RUNNING NORMAL OPERATING TEST Open all interior doors. Press HOME at any time to exit test, ENTER to continue. | Check that log file has space for test results, prompt user to review and delete records if not. Activate blower for 30 seconds, measure or calculate current static pressure and blower watt draw during normal operation, before prompting for masking outlets or adjusting the orifices. Calculate and report if CFM per ton of AC and blower watt draw meet the code requirements, and if blower is operating near optimum efficiency. Run AC compressor for one minute, check if watt draw is within efficient range. Interior doors are opened to decrease return path blockage in preparation for step 19 when they are closed. |
| 2 | Blower static pressure: 0.84 inches, optimum: 0.50 inches. Your blower uses 24% more electricity than if run at optimum pressure, wasting $312 during the last 365 days. Airflow is 26% lower than ideal. Check that no duct outlets are blocked and that most dampers in supply outlets are fully open, then test again. If results are similar, servicing of your system is recommended. Airflow 1314 CFM = 438 CFM/ton of AC. Fan watt draw .53 Watts/CFM. Enter to continue. | The static pressure result is in inches of water column. Since blower characteristics are known, the pressure corresponding to peak efficiency and the limits for acceptable operation are available. Report if blower outside of acceptable limits. Optionally, the system shuts down and displays an error message if it does not meet the manufacturer's safe operating ranges or code requirements for minimum airflow or maximum blower watt draw. |
| 3 | BEGINNING RETURN DUCT TEST Assure open ventilation of space containing furnace, mask return outlet(s), remove sliding supply cover, adjust return panel to 300 CFM position. Enter to continue. | Start blower only, check that static pressure has changed since last reading. Error if pressure has not changed. The blower is shut down if static pressure is lower or power consumptions is higher than safe for too long a period. |
| 4 | Display reads "Close return panel further" or "Open return panel further" until 0.5 IWC is reached, then "Pressure adjusted correctly. Enter to continue." | User adjusts orifice size until .5 IWC is reached. Error and help message if not within 3% of .5 IWC when Enter is pressed. |
| 5 | Check return outlet masks for leakage and reseal if necessary, then readjust return panel. Find and fix return leakage. Enter to continue. | User makes sure return outlet masks are in place and not leaking. Extensive sealing work can take place at this step. If pressure changes more than 3% due to sealing success, prompt to open or close panel further. Monitor pressure and store result when user continues. Error if value is not stable or within 3% of .5 IWC. |
| 6 | Enter reading from return panel scale, then Enter to continue: _____ | User enters reading of return CFM leakage number from calibration scale 105, using numeric keypad. |
| 7 | Return Duct Leakage: 8%. Cost of leakage $113 during the last 365 days. Enter to continue, Home to stop tests. | Number is scaled and compared with normal operating pressure and divided by normal airflow CFM, and multiplied by all space conditioning costs. Test result is logged. |

TABLE 1-continued

Steps in Running All Tests

| Step | Prompt in Display | Actions and notes |
|---|---|---|
| 8 | BEGINNING SUPPLY DUCT TEST Remove return outlet masks, mask all supply outlets, replace supply panel and set to 300 CFM position, remove return panel. Enter to continue. | On Enter, start blower motor and monitor pressure. Check that pressure has changed from last test, error message if not. The blower is shut down if static pressure is lower or power consumptions is higher than safe for too long a period. |
| 9 | Display reads "Close supply panel further" or "Open supply panel further" until 0.5 IWC is reached then "Pressure adjusted correctly. Enter to continue." | User adjusts orifice size until .5 IWC is reached. Error and help if cannot reach .5 IWC. |
| 10 | Check supply outlet masks for leaks and reseal if necessary, then return to readjust panel position. Find and seal leaks. Enter to continue. | User makes sure supply outlet masks are in place and not leaking. Extensive sealing work can take place at this step. If pressure is off by more than 3% due to sealing success, display prompts to open or close panel further. Monitor pressure and store result when user continues. Error if value is not stable or within 3% of .5 IWC |
| 11 | Enter reading from supply panel scale, then Enter to continue: _____ | User enters reading of supply CFM leakage number from calibration scale 105. Number is scaled by the ratio of pressure during test compared with normal operating pressure, divided by normal measured airflow. Predominant leakage is calculated. Costs of these leakages are calculated. Test results are logged. |
| 12 | Supply Duct Leakage: 22%. Total duct leakage: 30% costing $773 during the last 365 days. Predominant leakage: 14% greater supply leakage, causing increased infiltration costing $143 during the last 365 days. Duct system will benefit from sealing or replacement. Enter to continue, Home to stop tests. | Total duct leakage is also compared with the code standard stored in configuration settings and user is alerted if system would not meet the standard. |
| 13 | BEGINNING INFILTRATION TEST Mask all supply outlets, open return outlets if masked. Close all exterior doors, windows and dampers, including fireplace dampers. Remove ashes from fireplaces or cover with wet newspaper. Turn off bath, kitchen and other fans and clothes dryer. Open interior doors. Remove sliding supply panel. Replace sliding return panel and adjust to 1000 CFM position. Enter to continue. | On Enter, run blower and make sure pressure has changed from last test, error if not. The blower is shut down if static pressure is lower or power consumptions is higher than safe for too long a period. |
| 14 | Display reads "Close return panel further" or "Open return panel further" until 0.25 IWC is reached, then "Pressure adjusted correctly. Enter to continue." | Blower runs and user adjusts orifice size until .25 IWC is reached within 3%, or until panel is fully closed. In many buildings, the panel will be fully closed since leakage is very high. If power consumption by blower is too high or static pressure too low, user is prompted to partially block return outlets to reach 0.25 IWC. |
| 15 | Check that all outside doors, windows and dampers remain closed, interior doors remain open. Enter to continue. | Monitor and report on flow changes during these checks. Prompt to correct panel position if needed. |
| 16 | Enter reading from return panel scale, then Enter to continue: _____ | User enters infiltration leakage number from calibration scale 105, or indicates infiltration is off the scale. The number is scaled to its equivalent as if the test were conducted at 50 pascals, converted to natural infiltration rate using Lawrence Berkeley formula, and compared with code standard. Cost is calculated. |
| 17 | "Air infiltration is 1835 cubic feet per minute" or "Air infiltration is above 2000", where 2000 is the maximum airflow of blower. "Infiltration exceeds the maximum of 3 air changes per hour at 50 pascals ($ACH_{50}$) pressure. Cost of excess infiltration has been $1737 during the last 365 days. Find and fix air leaks now. Enter to continue." | 1835 is measured airflow minus last recorded return duct leakage value leakage. Reading updates every two seconds in display as user works, with a rolling 5 second average. Extensive sealing can take place during this step. |
| 18 | Remove all outlet masks. Return doors, windows and dampers to desired positions. Install and fully close both supply and return panels. Enter to continue, Home to stop tests. | On enter, check if pressure is close to normal as measured during step 1, and warn if not. Test result is logged. |

TABLE 1-continued

Steps in Running All Tests

| Step | Prompt in Display | Actions and notes |
|---|---|---|
| 19 | BEGINNING RETURN PATHS TEST Close and latch all interior doors. Enter to continue. | Measure airflow with return path closure and compare with normal airflow measured at Step 1. A significant increase in pressure indicates blocked return paths, Also check if blower is still operating within an efficient range. |
| 20 | "You may benefit from improving return paths by, for example, undercutting doors" or "Return path leakage acceptable." "Enter to continue, Home to stop tests." | |
| 21 | Test summary: Static pressure 24% too high costing $312 in unnecessary blower cost in the last 365 days. Air flow is 26% lower than ideal. Return ducts leakage 8%, supply ducts leakage 22%, total ducts leakage 30%. Predominant leakage: 14% greater supply leakage, causing increased infiltration costing $143 during the last 365 days. Cost of duct leakage $773 in the last 365 days. Infiltration 1835 cubic feet per minute is 4.5 air changes per hour at 50 pascals (or "Infiltration too high to measure") costing $1737 in the last 365 days. Find and fix duct and infiltration leakage. Return path blockage is high. $466 in electricity cost per year and $2178 in fuel cost could be saved per year by reducing duct leakage to 10%, predominant leakage to zero and infiltration to 3 $ACH_{50}$. The air conditioning compressor uses 10% too little power and the AC system needs servicing. Heating efficiency is 7 BTUs/sqft/HDD. Cooling efficiency is 8 BTUs/sqft/CDD. At the coldest hour in the last 365 days, Jan. 4, 2012 6-7 AM, the furnace ran 83% of the time. At the hottest hour, Oct. 2, 2012 4-5 PM, the air conditioner ran 48% of the time. The air conditioner is oversized. Enter to save these results or Clear to discard. | See notes below regarding calculations. Saving results appends a record to a log file that includes date, time, and all measurements and test results. Clearing discards test results. After saving, program returns to home screen. |

All references to the keypad should be interpreted as either a physical keypad, or touchpad areas on display 142. A "back" function is provided at each step, allowing the user to repeat a previous step. In embodiments in which air flow is measured automatically, steps involving manipulating sliding cover 103 ("panel") to achieve a standard static pressure, and entering results from calibration scale 105 on the keypad may be omitted. When any cost does not exceed a significance threshold set by the user, it is not displayed. When not all groups of steps are completed, a partial report is presented. If there are 20 minutes during which there is no input from the user, the latest results are discarded and the firmware reverts to the home screen.

Non-obvious calculations reported in the steps in Table 1 and not explained previously are described below:

Step 2: Excessive blower cost is available only after 30 days of blower run time data has been logged. It is calculated by the equation:

$$B_{cost} = kWh_{recent} * (PWR_{log} - PWR_{opt}) / PWR_{opt} * \$/kWh * Scale$$

Where:
- $B_{cost}$=annualized wasted blower electricity cost over a period >=30 days
- $kWh_{recent}$=blower kilowatt hours logged during last 30 days minimum
- $PWR_{log}$=blower draw in watts as measured during step 1, Table 1.
- $PWR_{opt}$=blower watts at peak efficiency from air handler curve data for air handler
- $/kWh=dollars per kilowatt hour as entered by user in settings
- Scale=scale factor to annualize dollar amount using heating degree data.

Step 7: Return duct leakage percentage is calculated as follows:

$$L_{ret} = CFM_{rleak} * Scale / CFM_{total} * 100$$

Where:
- $L_{ret}$=return duct leakage percentage
- $CFM_{rleak}$=Leakage in CFM as entered by user from sliding panel scale
- Scale=scale factor derived from the blower's curve, to correct for the difference between the static pressure at which the test was run compared with the static pressure at which the system normally runs as measured in step 1, Table 1.
- $CFM_{total}$=total normal blower airflow in CFM derived from the blower curves, as measured in step 1, Table 1, or from prior art estimates if curves are unavailable Step 12: Supply duct leakage percentage is calculated in the same way as in Step 7. Predominant leakage is the absolute value of supply leakage percentage minus return leakage percentage.

Step 17: The infiltration is calculated as $ACH_{50}$ as follows:

$$ACH_{50} = CFM_{inf} * 60 \text{ minutes per hour}/(SquareFeet*AvgCeilingHeight)*(P_{test}/50)^{0.65}$$

Where:
- $CFM_{inf}$=CFM of infiltration leakage as read from the panel's scale and input by the user
- SquareFeet=square feet of conditioned floor area as input in settings
- AvgCeilingHeight=average ceiling height as input in settings
- $P_{test}$=Pressure at which infiltration was tested in pascals. This is scaled to 50 pascals, the pressure used in the standard prior art test procedure.

Natural infiltration rate is calculated from $ACH_{50}$ using Lawrence Berkeley Labs n-factor as previously explained.

Step 21: Potential electricity savings per year is calculated as follows:

$$S_{elec} = ((kWh_{blow} + kWh_{ac})*L_{ducts}/100 * \$/kWh) + 1.08 * ((ACH_{nat} - ACH_{code}) + L_{predom}) * 24 \text{ hours}/\text{day} * Volume * HDD/60/100,000/AFUE*kWh/\text{therm}*\$/kWh$$

Where:
- $S_{elect}$=savings in blower and air conditioner electricity dollars from reducing duct leakage to 10%, predominant leakage to zero and air changes per hour, $ACH_{50}$, to code requirement level, assuming all leakage is to outdoors
- $kWh_{blow}$=the energy in kWh used by the blower motor in the last 365 days
- $kWh_{ac}$=the energy in kWh used by the air conditioner in the last 365 days
- $L_{ducts}$=the total duct leakage percentage as calculated in step 13
- \$/kWh=the marginal cost of electricity per kilowatt as input by the user
- $ACH_{nat}$=the natural infiltration rate in CFM corresponding to the $ACH_{50}$ measured infiltration rate as determined from the Lawrence Berkeley Labs table
- $ACH_{code}$=the natural infiltration rate in CFM corresponding to the code requirement in air changes per hour of the building space's volume
- $L_{predom}$=predominant duct leakage in CFM times average duty cycle of blower; this leakage drives equivalent amount of infiltration or exfiltration
- Volume=the volume of the conditioned space in the building from the product of square feet and average ceiling height entered by the user in settings
- HDD=heating degree days calculated from the difference between indoor and outdoor thermistors or from downloaded data
- AFUE=the annual fuel utilization efficiency of the furnace
- kWh/therm=the kilowatt hours needed to run the blower per therm of fuel input to the furnace burners, from furnace data In step 21, $ACH_{50}$ of 3 represents an $ACH_{code}$ of three air changes per hour, a possible code requirement. In practice, the code requirement stored in configuration settings is used.

The fraction of blower and AC energy used to satisfy total duct leakage is the duct leakage percentage. The first term of the equation takes total electricity used and multiplies it by the total duct leakage fraction and the cost per kilowatt. The second term uses the common formula for heat transferred by moving air:

$$Q = 1.08 * CFM * \Delta T$$

The $\Delta T$ term is the difference between indoor temperature and outdoor temperature, in this case averaged over the past year as heating degree days, HDD. Until a year's worth of $\Delta T$ data has been accumulated, the average temperature, in one embodiment, is determined by downloaded heating degree data for the vicinity of the location's ZIP code, through optional communications link 158, calculated at the various set points stored in the historic thermostat schedule. The therms of fuel used are scaled up from the BTUs infiltrated to the BTUs of fuel input to the furnace by AFUE efficiency factor. The formula does not account for duct leakage losses, as it is assumed that they will be sealed; in another embodiment they would further scale the losses higher. The Lawrence Berkeley Labs table gives a rate of natural ventilation (due to stack effect and wind) corresponding to a given blower door infiltration rate in $CFM_{50}$. In a still more accurate embodiment, a somewhat more complex equation also accounts for conditioned air lost through infiltration.

The potential fuel savings per year in step 21 is calculated as follows:

$$S_{fuel} = Therms_{365}*(L_{ducts}-10\%)/100*\$/\text{therm} + 1.08*((ACH_{nat}-ACH_{code})+L_{predom})*24\text{hours}/\text{day}*Volume*HDD/60/100,000/AFUE*\$/\text{therm}$$

Terms of the equation not already defined above are:
- $S_{fuel}$=potential savings in fuel cost by reducing duct leakage to 10%, predominant duct leakage to zero and air changes per hour to the code level
- $Therms_{365}$=the total therms of fuel used by the furnace during the past 365 days, from the log of burn valve 153 activity times the furnace input in BTUs from configuration settings
- \$/therm=the marginal cost of fuel per therm from user entered settings The final test results include potential dollar savings amounts only if the user has entered marginal fuel and electricity rates, has the optional outdoor thermistor installed or the heating and cooling degree data downloaded, and has had the thermostat installed for one year or more so that a complete annual record of indoor and outdoor temperatures has been collected, Several menu entries perform individual steps from the RUN ALL TESTS menu entry:
- NORMAL OPERATING TESTS runs steps 1 and 2
- RUN RETURN DUCT TEST runs steps 3-7
- RUN SUPPLY DUCT TEST runs steps 8-12
- RUN INFILTRATION TEST runs steps 13-18
- RUN RETURN PATH TEST runs steps 19-20

After completing any of these individual tests, the display reads: Press ENTER to save or HOME to discard.

If the user selects REVIEW PAST TEST RESULTS, the most recent test summary as in step 21 above is shown with date and time. Options during display of a test result are: down key moves to earlier result, up key moves to later result, delete key deletes the current result, home key goes to the home screen.

If the user selects REVIEW PAST ENERGY COSTS, the program presents a submenu:
- MOST RECENT DAY
- MOST RECENT 7 DAYS
- MOST RECENT 30 DAYS
- MOST RECENT 365 DAYS
- CHOOSE ANY PAST MONTH OR YEAR A complete annual cost record may appear, for example, as:
11/27/12-11/26/13 Fuel 6531 therms, $8988; AC 6531 kWh, $1201; blower 3531 kWh, $498

If the user selects REVIEW PAST WARNINGS, the most recent warning or error message is displayed, together with the date and time it was originally displayed. The Down key shows prior warnings and the Up key more recent warnings. The Home key returns to the home screen.

Cost and Saving Projections

In addition to the REVIEW PAST ENERGY COSTS, the system has cost projection functions. The home screen, where the current temperature and set point are shown, also contains a display of the energy costs for the past 30 days as shown in FIG. 15.

As the user changes the heat or cooling schedule, the firmware calculates the projected savings or extra cost of the setting change. For example, as the user prepares to extend the nighttime setback for weekdays by two hours, the display temporarily shows "Savings $34 per month", or if the daytime temperatures are increased by two degrees, "Extra cost $77 per month". Cost information is displayed for five seconds.

Every 90 days the system reviews the current schedule, and if nighttime setbacks are less than 6 hours, any heating set point is above 73 degrees, or any cooling set point is less than 76 degrees, the system prompts the user with a suggestion, such as "Extending nighttime setbacks from 6 to 8 hours would save $34 per month. To make this change press ENTER, to ignore press HOME" or "Lowering the daytime temperature from 74 to 70 degrees would save $77 per month. To make this change press ENTER, to ignore press HOME".

The user can also change schedules as in the prior art, but is prompted step by step through the changes, for example:

"Press UP or DOWN to make a change, or ENTER to continue, HOME to exit"
"Weeknight bedtime setback degrees: 55"
"Weeknight bedtime night setback starts at: 10:15 PM"
"Weeknight daytime degrees: 70"
"Wake time to return from setback: 6:45 AM"
"Weekend bedtime setback degrees: 55"
"Weekend bedtime night setback starts at: 10:15 PM"
"Weekend daytime degrees: 70"
"Wake time return from setback: 6:45 AM"

Potential savings or extra cost from changes are displayed during the steps.

Test Pressures and Flow Rates

The conventional duct test using professional test equipment is conducted at 25 pascals, about 0.1 IWC. By contrast, air handler testing with the present methods will take place at the higher normal operating pressure of about 0.5 IWC, five times as high. A pressure of 0.5 IWC is typical but some systems have other points of peak efficiency, a point that is immaterial to the analysis. Since 0.5 IWC is close to the normal operating pressure, more accurate results are achieved because certain types of "elastic" leaks do not scale in a uniform way. For example, leaks associated with mastic and plastic tape and draw bands that may have been used to seal duct joints may reduce in size at 25 pascals compared with normal operating pressure, due to the unpredictable elasticity of the materials. Another advantage of testing at full pressure is that it is much easier to find duct leaks, since they are blowing approximately five times stronger than they would be with professional test equipment.

The conventional infiltration test using professional test equipment is conducted at 50 pascals, about 0.2 IWC. An air handler infiltration test with the present method is conducted at the higher pressure of 0.25 IWC, only slightly higher. The maximum air flow rate is limited to a safe amount because of the limited capacity of blower 14, and automatic shutdown of blower 14 if power consumption is excessive, either by a circuit breaker in motor 148, or by motor power monitoring capability in control logic 149.

The Energy Conservatory Blower Door, the most popular infiltration tester, is capable of up to 5250 CFM at 50 pascals of air pressure, whereas an air handler for a typical 100,000 Btu furnace is capable of about 2000 CFM. If the rate of infiltration is very high, the blower door would be able to provide a measurement, while the air handler test will only show that infiltration is above 2000 CFM. However, the primary purpose for testing is make a building as tight as possible, and meet the ventilation standard with active ventilation, rather than residual infiltration. The air handler infiltration test is capable of measuring flow rates in the range expected for well-sealed buildings.

ADVANTAGES

Making buildings that are self-testing and self-monitoring and that encourage their occupants to save energy are key strategies to reduce energy use, an urgent national and worldwide goal. The present system implements these strategies and provides the following advantages:

1. Important measurements of building energy efficiencies may be made at lower cost and more convenience than with current methods. Making dual use of the air handler and programmable thermostat that are existing components of an HVAC system permits a low cost measurement solution, adding minimally to the cost of the building, at less than the cost of a single round of conventional testing, which is often hundreds of dollars. The air handler is already connected appropriately to the building for the test. By making testing more convenient and less expensive, builders and occupants are more likely to test, and rates of infiltration and duct leakage in new buildings will be improved at low cost.
2. The work of providing an energy audit for a building is greatly reduced and made more accurate, because the system is continuously auditing the building and recording highly detailed test results and providing cost calculations that would otherwise have to be made manually or in separate software. Detailed operating logs and operating costs with unprecedented detail are available for immediate diagnosis of problems.
3. Labor required to haul, set up and take down blower doors, duct tester, controllers, manometers and tubing is avoided. The costs of home energy rating services, HERS, testing as a building is commissioned are reduced. HVAC installers can pre-test their work to insure that it will pass a HERS test, required for building permit sign-off, the first time. Much HERS testing can be entirely supplanted with self-tests, as building codes recognize the new technology.
4. If code authorities decide to require it, the system can shut down space conditioning if operating parameters do not meet code requirements, thus enforcing the code requirements very effectively.
5. Permanent availability of test and monitoring capabilities permits testing during construction, sealing projects, energy retrofits, remodeling or repair work that may impact ducts, HVAC changeouts and system modifications, changes in ownership, and to explore unexpected changes in monitored energy efficiency or operating parameters, when conventional test equipment is unavailable or not cost effective to use. Added energy and carbon savings will result from building owners and building trade technicians testing more frequently and correcting problems with constant feedback on progress.

6. The present system solves the unrecognized problem of making lower cost testing methods and equipment available a broader class of technicians such as HVAC installers, general contractors, handymen, building operators and enterprising, technical building owners, as well existing HERS raters and energy auditors. The sophisticated embodiment may be used without prior training by any careful and enterprising person with some technical aptitude, because the system guides the user through the necessary steps, checks progress and reports results directly with no need for the manual calculations needed with conventional testing.

7. By prompting the user through test steps, the user errors often associated with following a memorized checklist are avoided. The chances of missing a step are significant, and the typical person doing the test is often working alone and may have no effective quality control supervision.

8. The expense of delays due to scheduling of test equipment and technicians is avoided since the test capability is always ready, and a special technician may not be needed.

9. Separate measurement of supply, return and predominant duct leakage gives duct sealing projects better direction, compared with the simple total leakage measurement of the prior art, since technicians will know which side of the system most needs sealing work, and have a guide to minimizing predominant leakage. The static pressure test under normal operating conditions helps determine whether adding another return duct and outlet, a common retrofit measure, is warranted.

10. The error caused by conventional uniform total duct system pressurization testing is reduced because the pressure applied during the supply test and the return test is from the same source as during normal operation, namely, from the system's own blower and at the same pressure. Pressure will be higher near the plenums, as in normal operation, and not at outlets where a duct tester is normally attached.

11. No inaccurate assumptions regarding system air flow, such as 400 CFM per ton of cooling, are needed to convert tested duct leakage to percentage of airflow because the test method calculates actual air flow under normal operating conditions.

12. Supply ducts are tested with pressurization and return ducts under depressurization, as in normal operation, eliminating a potential source of error compared with the normal total pressurization test.

13. In a conventional blower door test with the blower mounted in a single outside door, the building pressure is lower in rooms that are farthest from the blower, separated by doorways, halls and other obstructions to airflow, introducing a measurement error that varies from building to building. This source of error is reduced when the supply ducts supply air pressure from the air handler to every major room, during a pressurization test. Even if a depressurization test is run using the return ducts, the typical central location of the return outlet(s) often will provide more accuracy than testing from an exterior door.

14. Useful measures unavailable with conventional tests are provided, such as cost of too high static pressure and the cost of infiltration that is driven by predominant duct leakage, suboptimal air conditioner power, the duty cycle of the furnace at the coldest period and the duty cycle of the air conditioner during the warmest period, measures of furnace under- or over-sizing.

15. Required HERS tests of blower watt draw and airflow can be conducted automatically and frequently, with no intervention by the user, without the expense of a HERS rater, if code changes permit. The resulting measurements may be made by a building code inspector directly from the thermostat, or uploaded to a secure server. Future code changes may require the system to shut down when its operating parameters are out of compliance.

16. Studies have shown that up to one half of air conditioners in U.S. residences have incorrect refrigerant charge and need servicing, often for a period of many years. The inefficient operation of these systems is a major waste of carbon and money, a problem inadequately addressed by the prior art. The present system records compressor power consumption when refrigerant charge is first verified and then continuously monitors pressure, issuing warnings that will lead more often to timely service calls.

17. Previous thermostat designs have shown poor utilization of setbacks, and suboptimal set points, at a cost of 10-15% of potential building energy cost reductions. The present system assures that more of this potential is realized, as the system actively suggests schedule and set point improvements, and prompts users through changes in an easy way.

18. The system calculates and presents the potential savings to be achieved from energy efficiency measures of many different types, providing significant incentives at the point of system control, that lead to beneficial behavior changes and the upgrading of building efficiencies.

19. As buildings and their equipment become efficient, researchers, regulators and manufacturers need more highly detailed data on the performance of their products in the field, a problem that has been largely ignored in the prior art. The richly extensive logs maintained by the system, transferred through wireless communications capability 158, fulfils this need. Regulators will be able to determine the degree of compliance with code requirements by the analysis of data uploaded from the present system.

Comparison of Prior Art and Novel Duct Testing Methods

The prior art duct test uses a separate duct test system. A calibrated fan is connected via a flexible duct to one of the return outlets with a custom made adapter. All other outlets are masked with special wide tape. The air filter is removed. At this point the ducts, plenums and passage through the air handler should be air tight. An expensive and sensitive dual differential manometer is used to monitor the test. One side of the manometer is used to measure airflow through the fan, and the other side measures the pressure within the duct system. The fan speed is turned up until the pressure in the duct system is 25 pascals, about 0.1 IWC, and then the air flow is measured. This airflow is converted to a percentage of leakage by using the expected airflow through the system during normal operating conditions.

The conventional test method can take from 45 minutes to over an hour, depending primarily on the number and location of supply and return outlets. A trained technician must:

1. Haul a large bag of equipment from a vehicle, plus outlet adapters, and masking tape.
2. Unpack equipment from carrying cases
3. Select a suitable return outlet for the test
4. Locate or fabricate on site an adapter between the test equipment and the outlet
5. Tape the adapter to return outlet with masking tape (risking later paint peel)

6. Connect flex duct to adapter with tape or Velcro
7. Check for secure, low leakage fit
8. Select initial measurement ring size
9. Mount ring to fan
10. Connect fan controller between fan and a nearby electrical outlet
11. Connect first manometer hose to fan
12. Mask all supply and return outlets with wide tape
13. Connect other manometer hose inside a nearby supply outlet
14. Open an exterior door or window to supply the fan
15. Set several configuration settings on the manometer for the test
16. Adjust fan speed for 25 pascals duct system pressure
17. Read tentative duct leakage CFM
18. [Optional] If reading is out of range, change rings and repeat
19. Check all outlet masks. Some may have blown open.
20. [Optional] Look for hidden outlets if initial reading too high
21. Check and record areas of noticeable leakage and final total CFM
22. Shut down fan and manometer
23. Remove all masking
24. Repeat in reverse order steps 1, 2, 5, 6, 9, 10, 11, 12, 13, and 14.

By contrast, using the automated method of present system, allows the user to eliminate all but steps: 12 (masking done in two separate steps), 17, 19, 20, 21 and 23. Step 15 is replaced by making menu choices in the thermostat's user interface. Step 16 is replaced by adjusting the orifice and removing a panel. Obviously much work is eliminated, and the result is three types of duct leakage, not just total leakage.

Comparison of Prior Art and Novel Infiltration Testing Methods

The method of testing infiltration with the prior art is using a blower door, a large variable speed calibrated fan that pressurizes or depressurizes the home through a temporary fabric panel and frame in an exterior doorway, and measures resulting air flow in or out of the building through envelope leaks. The two principal manufacturers are The Energy Conservatory and Retrotec. The same expensive dual differential manometer used for duct testing is used to monitor the test. One side of the manometer measures air flow through the fan, and the other measures the difference in pressure between the inside and outside of the building. The fan speed is turned up gradually, increasing building pressure and infiltration flow until a test pressure of 50 pascals, about 0.2 IWC, is reached, then the air flow rate is measured, and compared with code requirements. Using a table developed at Lawrence Berkeley Labs, the test pressure can be used to predict the natural infiltration rate, and converted into energy and cost estimates.

This test takes a trained technician about an hour since they must:
1. Haul three bags of equipment from a vehicle
2. Unpack equipment from the three carrying cases
3. Select a suitable outside door for the test
4. Assemble four pieces of aluminum door frame.
5. Adjust assembled frame to an outside door size
6. Apply fabric cape to frame
7. Mount frame in doorway
8. Tighten frame in doorway
9. Check for secure, low leakage fit
10. Mount fan in cape
11. Select initial measurement ring size for fan
12. Remove unused rings
13. Connect fan controller between fan and nearby electrical outlet
14. Connect hose between manometer and fan
15. Connect other manometer hose to outdoors through hole in cape
16. Close all exterior doors and windows
17. Open all interior doors
18. Close fireplace damper, cover or remove ashes
19. Configure manometer by making several configuration settings
20. Adjust fan speed for 50 pascals building pressure
21. Read and record tentative infiltration CFM
22. [Optional] If reading is out of range, change rings
23. Check doors and windows (some may have blown open)
24. Check and record areas of noticeable leakage
25. [Optional] Convert raw CFM number into natural ventilation rate using LBL table
26. Compare ventilation rate with code requirement or other specification
27. Shut down fan and manometer
28. Repeat in reverse order, steps 1, 2, 4, 6, 7, 10, 12, 13, 14, 15, 16, 17, 18.

By contrast, the same test using an automated version of the test allows the user to eliminate all but steps 16, 17, 18, 21, 23, and 24. Step 19 is replaced by making menu choices in the user interface to select the desired test. Step 20 is replaced by adjusting the orifice. Step 22 might be replaced by partially blocking a return outlet. A new step includes masking supply outlets, but this is needed for a duct test conducted at the same time, so may not count in time and motion analysis. Obviously, a large amount of work is eliminated.

High accuracy is not needed to make great improvements in infiltration rate. The current ventilation goal under the ASHRAE 62.2 standard, adopted by California and many other states, is to seal buildings as tightly as possible and not to a specified leakage rate, since the standard requires minimum ventilation by mechanical means, such as a kitchen exhaust fan.

CONCLUSION

While the above description contains many specificities, these should not be construed as limitations on the scope of any embodiment, but as exemplifications of various embodiments. Many other ramifications and variations are possible within the teachings of the various embodiments. For example, microcontroller 141 could be the processor in a tablet computer serving as highly programmable thermostat, in which case communications link 151 would be through Wi-Fi. When communications link 151 is a wireless link, the device will be fully functional when removed from its cradle and used in a more convenient way. Speed control over motor 148 could be provided by circuitry in control logic 149, as directed by firmware in microcontroller 141 during a test method. The content of the home screen shown in FIG. 15 could be different, for example by showing more schedule information and the latest alert or warning and fewer top level menu choices, while retaining all the functions described herein. The system can be implemented as a kit to upgrade existing HVAC equipment with a new thermostat, communications link, and parts to modify the air handler. Alerts and warnings may be sent to users by means of text messaging, emails and instant messaging.

The invention claimed is:

1. An air handler system including supply duct leakage testing functions, comprising:

a. an air handler comprising a return orifice, an air blower, and a supply orifice;
b. a duct system comprising at least one supply duct, coupled with said supply orifice, whereby to convey air flow generated by said air blower;
c. an outlet terminating each supply duct;
d. means for temporarily blocking air flow through the outlets in combination with said outlets;
e. means for opening said return orifice to the unrestricted intake of air from an area outside the air handler, whereby said blocking and said return orifice means define a path for air with supply duct leakage as the only remaining substantial restriction to the air flow;
f. means for measuring at least one air handler operating parameter adapted for calculating supply duct leakage rate through the air handler; and
g. means for converting the operating parameter to duct leakage air flow rate, whereby said air handler system measures supply duct leakage air flow rate from time to time without the need for external test equipment, to aid in achieving and maintaining energy efficiency in a building and determining the need for maintenance or repairs.

2. An air handler system including return duct leakage testing functions, comprising:
a. an air handler comprising a return orifice, an air blower, and a supply orifice;
b. a duct system comprising at least one return duct, coupled with said return orifice, whereby to convey air flow input by said air blower;
c. an outlet terminating each return duct;
d. means for temporarily blocking air flow through the outlets in combination with said outlets;
e. means for opening said supply orifice to the unrestricted intake of air from an area outside the air handler, whereby said blocking and said orifice means define a path for air with return duct leakage as the only remaining substantial restriction to the air flow;
f. means for measuring at least one air handler operating parameter adapted for calculating return duct leakage air flow rate through the air handler; and
g. means for converting the operating parameter to duck leakage air flow rate;

whereby said air handler system measures return duct leakage air flow rate from time to time without the need for external test equipment, to aid in achieving and maintaining energy efficiency in a building and determining the need for maintenance or repairs.

3. An air handler system including building envelope infiltration testing functions, comprising:
a. an air handler comprising a return orifice, an air blower, and a supply orifice;
b. a duct system comprising at least one supply duct, coupled with said supply orifice, whereby to convey air flow input by said air blower;
c. an outlet terminating each supply duct;
d. means for temporarily blocking air flow through the outlets in combination with said outlets;
e. means for opening said supply orifice to the unrestricted intake of air from an area outside the air handler, whereby said blocking and said supply orifice means define a path for air with building envelope infiltration as the only remaining substantial restriction to the air flow;
f. means for measuring at least one air handler operating parameter adapted for calculating building envelope infiltration air flow rate through the air handler; and
g. means for converting the operating parameter to building infiltration air flow rate;

whereby said air handler system measures building envelope infiltration air flow rate from time to time without the need for external test equipment, to aid in achieving and maintaining energy efficiency in a building and determining the need for maintenance or repairs.

4. An air handler system including building envelope exfiltration testing functions, comprising:
a. an air handler comprising a return orifice, an air blower, and a supply orifice;
b. a duct system comprising at least one return duct, coupled with said return orifice, whereby to convey air flow input by said air blower;
c. an outlet terminating each return duct;
d. means for temporarily blocking air flow through the outlets in combination with said outlets;
e. means for opening said return orifice to the unrestricted intake of air from an area outside the air handler, whereby said blocking and said orifice means define a path for air with building envelope exfiltration as the only remaining substantial restriction to the air flow;
f. means for measuring at least one air handler operating parameter adapted for calculating building envelope exfiltration air flow rate through the air handler; and
g. means for converting the operating parameter to building envelope exfiltration air flow rate;

whereby said air handler system measures building envelope exfiltration air flow rate from time to time without the need for external test equipment, to aid in achieving and maintaining energy efficiency in a building and determining the need for maintenance or repairs.

5. An air handler system including at least one of duct testing and building envelope leakage functions, comprising:
a. an air handler comprising a return orifice, an air blower, and a supply orifice;
b. a duct system comprising at least one duct, coupled with said at least one of said return orifice and said supply orifice, whereby to cause air flow input by said air blower;
c. an outlet terminating each duct;
d. means for temporarily blocking air flow through the outlets in combination with said outlets;
e. means for opening said return orifice or said supply orifice to enable the unrestricted movement of air from an area outside the air handler, whereby said blocking and said opening means define a path for air with air leakage as the only remaining substantial restriction to the air flow;
f. means for measuring at least one air handler operating parameter adapted for calculating leakage air flow rate through the air handler, wherein the leakage air flow is one of supply duck leakage, return duck leakage, building infiltration and building envelope exfiltration; and
g. means for converting the operating parameter to leakage air flow rate;

whereby said air handler system measures building envelope exfiltration air flow rate from time to time without the need for external test equipment, to aid in achieving and maintaining energy efficiency in a building and determining the need for maintenance or repairs.

6. The system of claim 1, 2, 3, 4 or 5 wherein said means for measuring the air flow rate comprises:
a. measuring an air handler operating parameter from at least one of: the total external static pressure differential between the supply opening and the return opening of said air handler, the power consumption of said air blower, and the rotational speed of said air blower;

b. deriving the air flow rate from a table that correlates air flow with said air handler parameter.

7. The system of claim 1, 2, 3, 4 or 5 wherein said means for measuring the air flow rate comprises:

a. measuring an air handler operating parameter from at least one of: the total external static pressure differential between the supply opening and the return opening of said air handler, the power consumption of said air blower, and the rotational speed of said air blower;

b. deriving the air flow rate from a table that calculates air flow with said air handler parameter.

* * * * *